United States Patent
Wang et al.

(10) Patent No.: US 9,430,080 B2
(45) Date of Patent: Aug. 30, 2016

(54) TOUCH POSITIONING METHOD, TOUCH SCREEN, TOUCH SYSTEM, AND DISPLAY

(75) Inventors: Yuhui Wang, Beijing (CN); Zhenyu Wu, Beijing (CN); Xinlin Ye, Beijing (CN); Jianjun Liu, Beijing (CN); Xinbin Liu, Beijing (CN)

(73) Assignee: BEIJING IRTOUCH SYSTEMS CO., LTD, Beijing (CN)

( * ) Notice: Subject to any disclaimer, the term of this patent is extended or adjusted under 35 U.S.C. 154(b) by 385 days.

(21) Appl. No.: 13/821,500

(22) PCT Filed: Jul. 28, 2011

(86) PCT No.: PCT/CN2011/077732
§ 371 (c)(1),
(2), (4) Date: Mar. 7, 2013

(87) PCT Pub. No.: WO2012/031513
PCT Pub. Date: Mar. 15, 2012

(65) Prior Publication Data
US 2013/0162877 A1    Jun. 27, 2013

(30) Foreign Application Priority Data
Sep. 7, 2010  (CN) .......................... 2010 1 0274491

(51) Int. Cl.
*G06F 3/042*  (2006.01)
*G06F 3/041*  (2006.01)

(52) U.S. Cl.
CPC ............. *G06F 3/0416* (2013.01); *G06F 3/041* (2013.01); *G06F 3/042* (2013.01)

(58) Field of Classification Search
CPC .................. G06F 3/041–3/047; G06F 3/0416
See application file for complete search history.

(56) References Cited

U.S. PATENT DOCUMENTS

| 7,599,520 B2 * | 10/2009 | Dempski et al. | ............. 382/103 |
| 2010/0141963 A1 * | 6/2010 | Hsu et al. | ..................... 356/614 |

FOREIGN PATENT DOCUMENTS

| CN | 1674042 | 9/2005 |
| CN | 101408813 | 4/2009 |
| CN | 101697105 | 4/2010 |
| CN | 201489500 | 5/2010 |

* cited by examiner

*Primary Examiner* — Matthew Sim
(74) *Attorney, Agent, or Firm* — Harness, Dickey & Pierce, P.L.C.

(57) ABSTRACT

The present invention relates to a touch positioning method, a touch screen, a touch system and a display. The touch positioning method comprises: processing image collected by the first camera to obtain first image data, and processing image collected by the second camera to obtain second image data, wherein the first image data comprise one touch image block, and the second image data comprise at least two touch image blocks; processing the second image data to obtain third image data, the third image data comprising image blocks of two suspected touch objects; obtaining a distance between the two suspected touch objects according to the first image data and the third image data; and obtaining location information of an actual touch object according to the first image data, the third image data and the distance between the two suspected touch objects. The invention may eliminate misjudgment caused by "crack dot" (FIG. 5).

25 Claims, 9 Drawing Sheets

TOUCH POSITIONING METHOD, TOUCH SCREEN, TOUCH SYSTEM, AND DISPLAY

FIELD OF THE INVENTION

The present invention relates to the field of photoelectric technology, and in particular, to a touch positioning method, a touch screen, a touch system and a display.

BACKGROUND ART

FIG. 1 is a structural schematic diagram of a camera based touch screen in the prior art, comprising a touch detection region 10, two cameras 111 and 112 respectively installed on two corners of the touch detection region 10, two light sources 121 and 122 respectively installed at locations adjacent to the cameras 111 and 112, a regression reflection bar 13 installed around the touch detection region 10, and a processing module 14 connected with the cameras 111 and 112. The regression reflection bar 13 reflects light emitted by the light source 121 to the camera 111, and reflects light emitted by the light source 122 to the camera 112; the cameras 111 and 112 respectively collect image data and send the image data to the processing module 14 which processes the image data to determine location information of a touch object. The touch screen may be used to obtain location information of a plurality of touch objects.

FIG. 2 is a schematic diagram of brightness of the image data collected by the camera 111 in the touch screen as shown in FIG. 1 when there is no touch object in the touch detection region. When there is no touch object in the touch detection region 10, there does not exist any darker area in the image data collected by the camera 111, and similarly, there also does not exist any darker area in the image data collected by the camera 112. FIG. 3 is a schematic diagram of brightness of the image data collected by the camera 111 in the touch screen as shown in FIG. 1 when there is one touch object in the touch detection region. When there is one touch object in the touch detection region 10, since the touch object obstructs light emitted by the light source 121 to the regression reflection bar 13, the regression reflection bar 13 cannot reflect light to the camera 111, so there is a dark bar at the location corresponding to the touch object in the image data collected by the camera 111, the dark bar being the image of the touch object. Similarly, there is also a dark bar at the location where the touch object is in the image data collected by the camera 112. And then, the processing module 14 determines location information of the touch object based on the image data collected by the cameras 111 and 112.

FIG. 4 is a schematic diagram of brightness of the image data collected by the camera 111 in the touch screen as shown in FIG. 1 when a touch object is near to the camera 111. When a touch object is near to the camera 111, since light reflected by the touch object itself is stronger, it results in a bright bar 41 instead of a dark bar at the location corresponding to the touch object in the image data collected by the camera 111. Due to shadows on both sides of the touch object, there are dark bars 42, 43 respectively on both sides of the location of the touch object. Here, the dark bar 42, 43 is called "crack dot". In some cases, there will be more than three "crack dots"; at the time, the touch object is far away from the camera 112, and there will be a dark bar at the location where the touch object is in the image data collected by the camera 112. When the processing module 14 determines location information of the touch object according to the image data collected by the cameras 111 and 112, it will obtain location information of two touch objects, and in some cases, even three or more touch objects, which leads to misjudgment.

SUMMARY OF THE INVENTION

The invention provides a touch positioning method, touch screen, touch system and display, to eliminate misjudgment caused by "crack dot" in a camera based touch screen.

The invention provides a touch positioning method, the method being applied to a camera based touch screen, comprising at least two cameras and a regression reflection bar, the at least two cameras comprising a first camera and a second camera, the method comprising:

processing image collected by the first camera to obtain first image data, and processing image collected by the second camera to obtain second image data, wherein the first image data comprise one touch image block, and the second image data comprise at least two touch image blocks;

processing the second image data to obtain third image data, the third image data comprising image blocks of two suspected touch objects;

obtaining a distance between the two suspected touch objects according to the first image data and the third image data;

obtaining location information of the actual touch object according to the first image data, the third image data and the distance between the two suspected touch objects.

The invention further provides a touch screen, comprising at least two cameras, at least two light sources, a regression reflection bar and a processing module, the at least two cameras comprising a first camera and a second camera, the processing module comprising:

an image data obtaining unit for processing image collected by the first camera to obtain first image data, and processing image collected by the second camera to obtain second image data, wherein the first image data comprise one touch image block, and the second image data comprise at least two touch image blocks;

a second image data processing unit for processing the second image data to obtain third image data, the third image data comprising image blocks of two suspected touch objects;

a distance obtaining unit for obtaining a distance between the two suspected touch objects according to the first image data and the third image data;

an actual touch object location information obtaining unit for obtaining location information of the actual touch object according to the first image data, the third image data and the distance between the two suspected touch objects.

The invention further provides a touch system corresponding to the touch screen.

The invention further provides a display, comprising a display unit and the touch screen as described.

The invention processes image data collected by the first camera to obtain the first image data, processes image data collected by the second camera to obtain the second image data, and then processes the second image data to obtain the third image data comprising image blocks of two suspected touch objects, and finally obtains location information of the actual touch object according to the first image data, the third image data and the distance between the two suspected touch objects, thereby eliminating misjudgment caused by "crack dot".

DETAILED DESCRIPTION OF THE PREFERRED EMBODIMENTS

The present invention is further described as follows in combination with the figures of the description and the specific embodiments.

In the following embodiments, an imaging device may specifically be a camera.

First Embodiment of Touch Positioning Method

Figure 1:
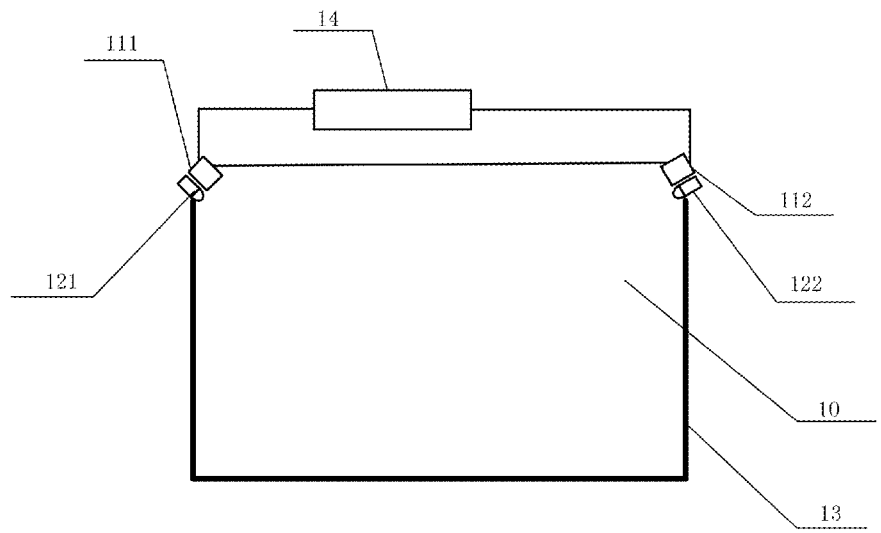
FIG. 1 is a structural schematic diagram of a camera based touch screen in the prior art.
Figure 2:
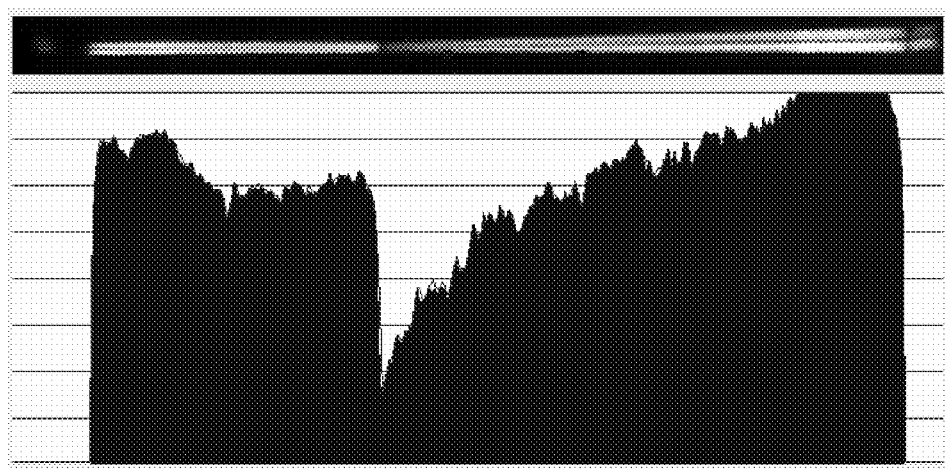
FIG. 2 is a schematic diagram of brightness of the image data collected by the camera 111 in the touch screen as shown in FIG. 1 when there is no touch object in the touch detection region.
Figure 3:
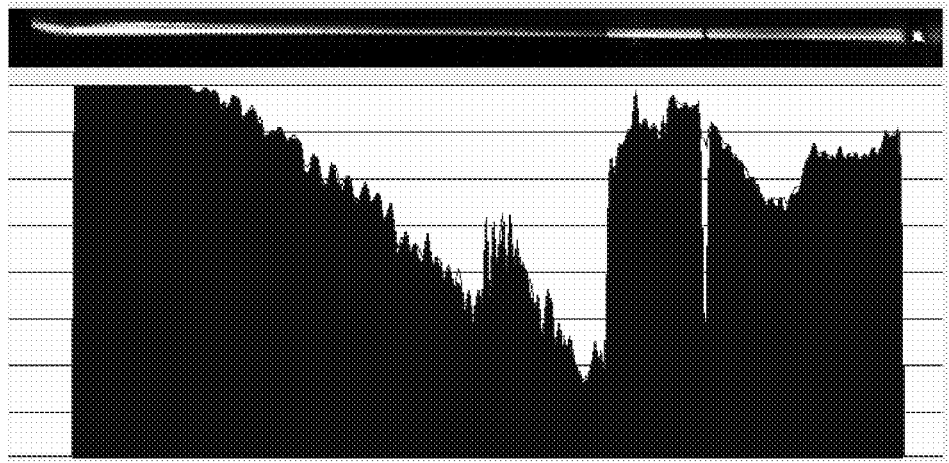
FIG. 3 is a schematic diagram of brightness of the image data collected by the camera 111 in the touch screen as shown in FIG. 1 when there is one touch object in the touch detection region.
Figure 4:
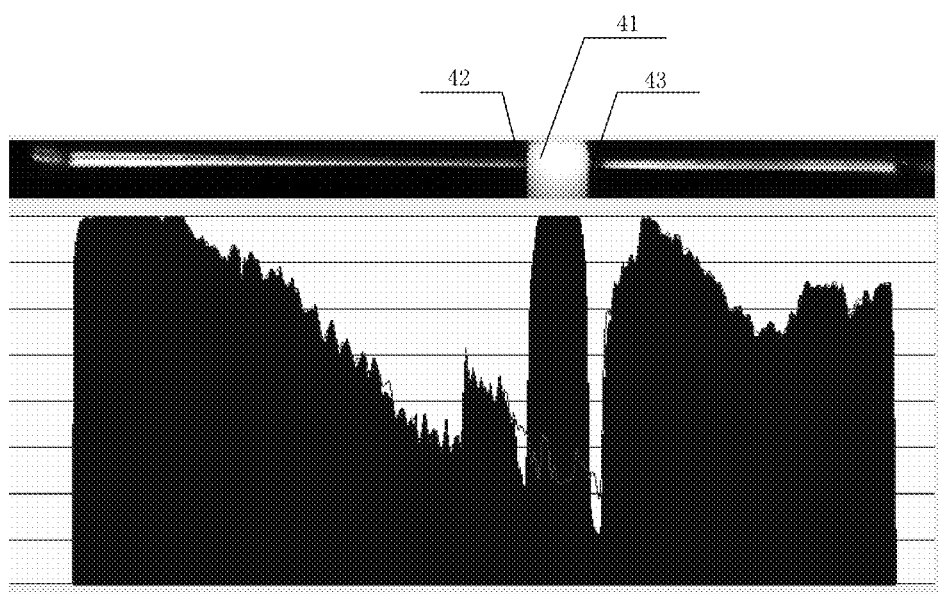
FIG. 4 is a schematic diagram of brightness of the image data collected by the camera 111 in the touch screen as shown in FIG. 1 when a touch object is near to the camera 111.

The embodiment applies a touch screen, and the structural schematic diagram of the touch screen may refer to the schematic diagram as shown in FIG. 1, wherein a first camera may specifically be camera 111, and a second camera may specifically be camera 112. It should be noted that two cameras are shown here merely as an example and the touch screen may also comprise more cameras.

Figure 5:
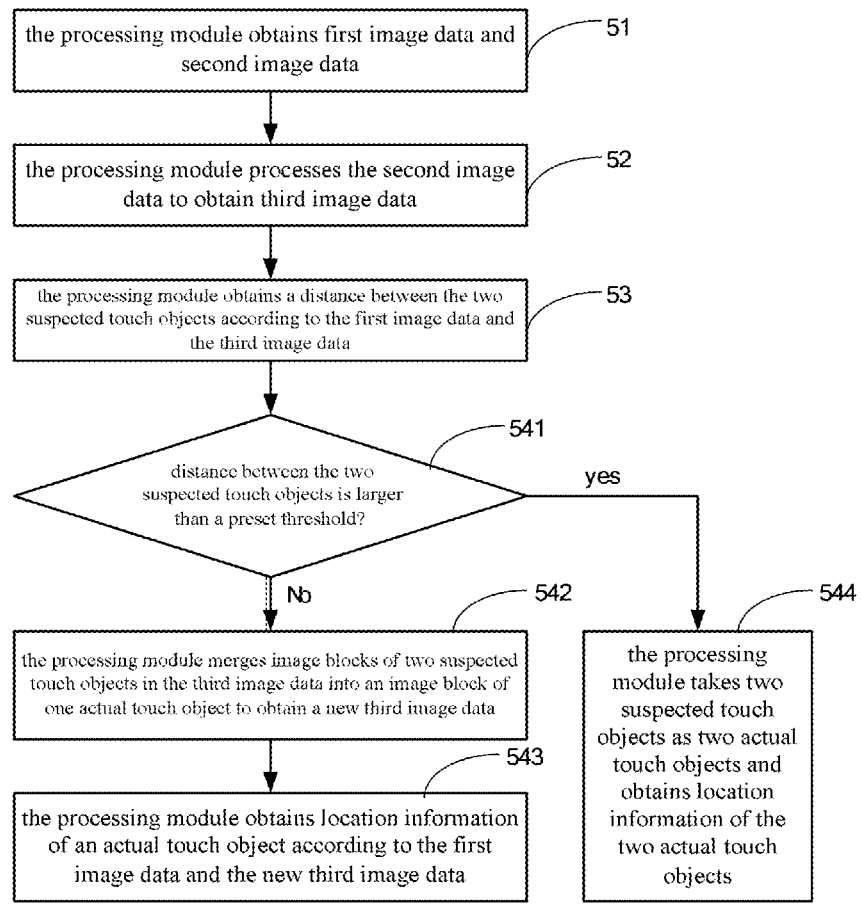
FIG. 5 is a schematic flowchart of a first embodiment of a touch positioning method of the present invention.

FIG. 5 is a schematic flowchart of a first embodiment of a touch positioning method of the present invention, comprising the following steps.

At step 51, a processing module obtains first image data and second image data.

Specifically, the processing module processes image collected by the first camera to obtain first image data, and processes image collected by the second camera to obtain second image data, wherein the first image data comprise one touch image block, and the second image data comprise at least two touch image blocks. Specifically, after binarization is performed with respect to images collected by the first camera and second camera, the first image data and second image data comprise two kinds of image blocks, which are bright and dark, wherein the dark image block is a touch image block.

At step 52, the processing module processes the second image data to obtain third image data, the third image data comprising image blocks of two suspected touch objects.

Figure 6A:
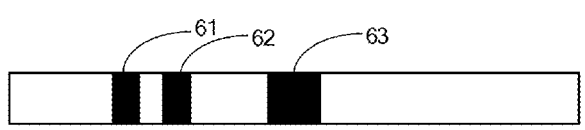
FIG. 6A is a schematic diagram of second image data in the first embodiment of the touch positioning method of the present invention.
Figure 6B:
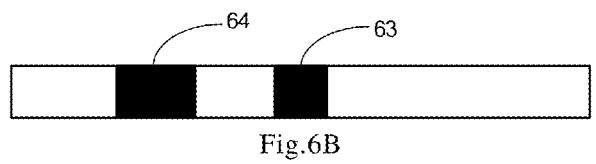
FIG. 6B is a schematic diagram of the second image data after one touch image block is merged in the first embodiment of the touch positioning method of the present invention.

Specifically, when the second image data comprise two touch image blocks, the processing module regards the two touch image blocks as image blocks of two suspected touch objects, and then such image data comprising image blocks of only two suspected touch objects are regarded as the third image data; when the second image data comprise at least three touch image blocks, the processing module merges, according to a distance between two adjacent edges of two adjacent touch image blocks, the at least three touch image blocks into image blocks of two suspected touch objects, and then such image data comprising image blocks of only two suspected touch objects are regarded as the third image data. Specifically, the processing module orders the distances between two adjacent edges of two adjacent touch image blocks according to size, and then merges other touch image blocks than two adjacent touch image blocks with maximum distance in all the touch image blocks, so as to merge the at least three touch image blocks into image blocks of two suspected touch objects, so that the third image data comprises image blocks of two suspected touch objects. The process of merging touch image blocks is described below taking the three touch image blocks as an example. As shown in FIG. 6A which is a schematic diagram of the second image data in the first embodiment of the touch positioning method of the present invention, the second image data comprises three touch image blocks 61, 62 and 63, wherein the distance between two adjacent edges of two adjacent touch image blocks 61 and 62 is smaller, and the distance between two adjacent edges of two adjacent touch image blocks 62 and 63 is larger. FIG. 6B is a schematic diagram of the second image data after one touch image block is merged in the first embodiment of the touch positioning method of the present invention. Since the distance between two adjacent edges of two adjacent touch image blocks 62 and 63 is larger than the distance between two adjacent edges of two adjacent touch image blocks 61 and 62, the touch image blocks 61 and 62 are merged into one touch image block 64. The merging process is mainly performed by identifying the area between the touch image blocks 61 and 62 also as a touch image block, and taking the touch image blocks 64 and 63 as touch image blocks of two suspected touch objects.

At step 53, the processing module obtains a distance between the two suspected touch objects according to the first image data and the third image data.

At step 54, the processing module obtains location information of the actual touch object according to the first image data, the third image data and the distance between the two suspected touch objects.

Further, step 54 may further comprise the following steps.

At step 541, the processing module judges whether the distance between the two suspected touch objects is larger than a preset threshold; if the distance between the two suspected touch objects is less than or equal to the preset threshold, step 542 is performed, and if the distance between the two suspected touch objects is larger than the preset threshold, step 544 is performed.

Specifically, the processing module obtains the distance between the two suspected touch objects according to the first image data and the third image data, and the preset threshold may be determined according to the actual touch object commonly used; for example, when the touch object is a finger, the distance may be 12.7 mm.

At step 542, the processing module merges image blocks of two suspected touch objects in the third image data into one image block of an actual touch object to obtain a new third image data.

Figure 6C:
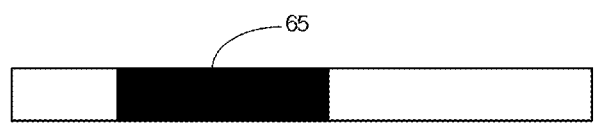
FIG. 6C is a schematic diagram of new third image data in the first embodiment of the touch positioning method of the present invention.

Specifically, as shown in FIG. 6C which is a schematic diagram of new third image data in the first embodiment of the touch positioning method of the present invention, the touch image blocks 63 and 64 are merged into one touch image block 65. Specifically, the area between the touch image blocks 63 and 64 is changed as a touch image block, and the touch image block 65 is regarded as an image block of an actual touch object. After step 542 is performed, step 543 is performed.

At step 543, the processing module obtains location information of the actual touch object according to the first image data and the new third image data.

At step 544, the processing module takes the two suspected touch objects as two actual touch objects and obtains location information of the two actual touch objects.

In this embodiment, the processing module processes the image data collected by the first camera to obtain the first image data, processes the image data collected by the second camera to obtain the second image data, and then processes the second image data to obtain the third image data comprising image blocks of two suspected touch objects, and finally obtains location information of the actual touch object according to the first image data, the third image data and the distance between the two suspected touch objects, thereby eliminating misjudgment caused by "crack dot".

Second Embodiment of Touch Positioning Method

Figure 7:
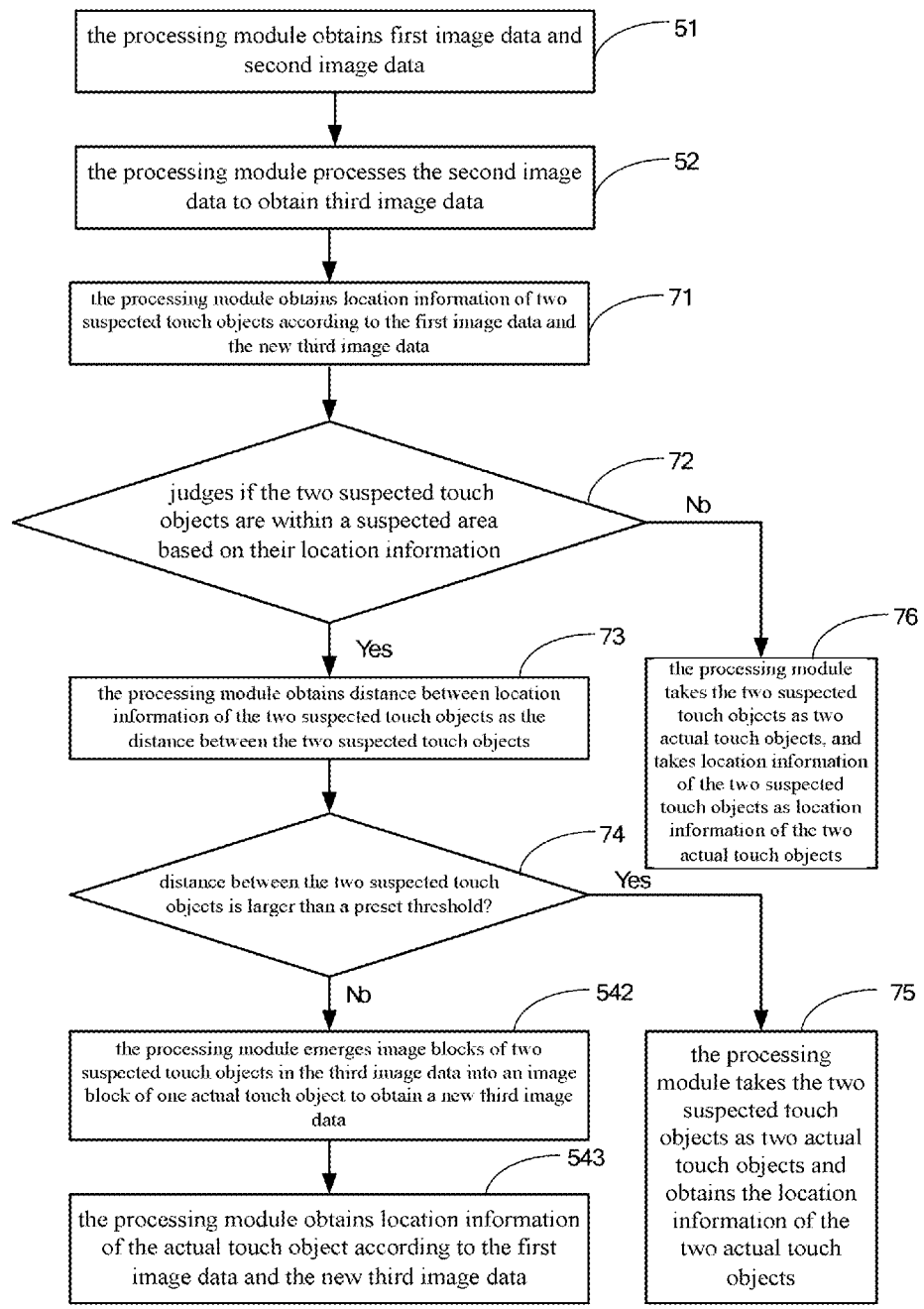
FIG. 7 is a schematic flowchart of a second embodiment of the touch positioning method of the present invention.

FIG. 7 is a schematic flowchart of a second embodiment of the touch positioning method of the present invention, and the difference from the schematic flowchart as shown in FIG. 5 is that step 541 may comprise the following steps.

At step 71, the processing module obtains location information of two suspected touch objects according to the first image data and the third image data.

At step 72, the processing module judges whether the two suspected touch objects are both located within a suspected area according to the location information of the two suspected touch objects.

In an example, the suspected area is any closed area enclosing the second camera; preferably, the suspected area is a rectangle or a sector, wherein the rectangle takes the optical center of the second camera as a vertex, and the sector takes the optical center of the second camera as circle center; optionally, the suspected area may further be the entire touch detection region or any other shape.

At step 73, if both the two suspected touch objects are located within the suspected area, the processing module obtains the distance between location information of the two suspected touch objects as the distance between the two suspected touch objects.

At step 74, the processing module judges whether the distance between the two suspected touch objects is larger than the preset threshold.

On the basis of the previous embodiment, step 544 may specifically be the following step.

At step 75, the processing module takes the two suspected touch objects as two actual touch objects and takes the location information of the two suspected touch objects as location information of the two actual touch objects.

In addition, the embodiments may further comprise the following step.

At step 76, if not both the two suspected touch objects are located within the suspected area, the processing module takes the two suspected touch objects as two actual touch objects, and takes location information of the two suspected touch objects as location information of the two actual touch objects.

Figure 8:
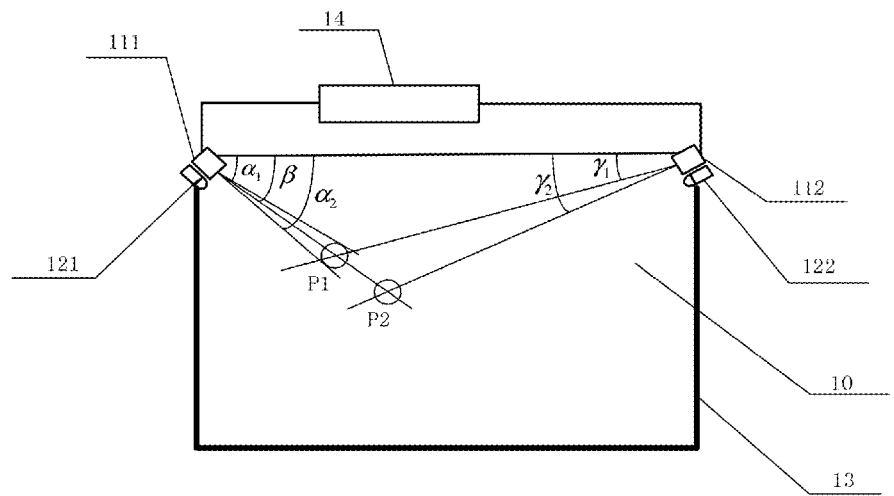
FIG. 8 is a schematic diagram showing the principle of a first solution of obtaining location information of two suspected touch objects in the second embodiment of the touch positioning method of the present invention.

At step 71, the processing module may use two solutions to obtain location information of the two suspected touch objects. FIG. 8 is a schematic diagram showing the principle of a first solution of obtaining location information of the two suspected touch objects in the second embodiment of the touch positioning method of the present invention. In FIG. 8, camera 111 is the first camera, camera 112 is the second camera, P1 is the first suspected touch object, P2 is the second suspected touch object; it is seen from the camera 111 that the first suspected touch object P1 and the second suspected touch object P2 are in the same straight line, and thus the first image data has only one touch image block while the third image data has an image block of a first suspected touch object and an image block of a second suspected touch object. The processing module may obtain, according to location information of two edges of the touch object image block in the first image data, angles $\alpha_1$ and $\alpha_2$ between the connection lines from the two edges of the first suspected touch object P1 corresponding to two edges of the touch image block respectively to the optical center of the first camera and the connection line from the optical center of the first camera to the optical center of the second camera, while the angles between the connection lines from the two edges of the second suspected touch object P2 to the optical center of the first camera and the connection line from the optical center of the first camera to the optical center of the second camera are also $\alpha_1$ and $\alpha_2$. Then the processing module obtains the first actual direction information $\beta$ according to $\alpha_1$ and $\alpha_2$, wherein the following relationship between $\beta$ and $\alpha_1$ and $\alpha_2$ is satisfied:

$$\beta = \frac{\alpha_1 + \alpha_2}{2}$$

The first actual direction information is an angle between the connection line from the center of the first suspected touch object to the optical center of the first camera and the connection line from the optical center of the first camera to the optical center of the second camera, while this angle is also the angle between the connection line from the center of the second suspected touch object P2 to the optical center of the first camera and the connection line from the optical center of the first camera to the optical center of the second camera. Similarly, the processing module may obtain, according to the location information of two edges of the image block of the first suspected touch object in the third image data, angles between the connection lines from the two edges of the first suspected touch object corresponding to two edges of the touch image block of the first suspected touch object respectively to the optical center of the second camera and the connection line from the optical center of the first camera to the optical center of the second camera, and obtains, according to the angles between the connection lines from the two edges of the first suspected touch object corresponding to two edges of the touch image block of the first suspected touch object respectively to the optical center of the second camera and the connection line from the optical center of the first camera to the optical center of the second camera, the first suspected direction information $\gamma_1$. The first suspected direction information $\gamma_1$ is the angle between the connection line from the center of the first suspected touch object to the optical center of the second camera and the connection line from the optical center of the first camera to the optical center of the second camera. It can be seen from the previous text that the first suspected direction information $\gamma_1$ here is actually obtained also through two angels. Then, according to the location information of the two edges of the touch image block of the second suspected touch object in the third image data, angles between the connection lines from the two edges of the second suspected touch object corresponding to two edges of the touch image block of the second suspected touch object respectively to the optical center of the second camera and the connection line from the optical center of the first camera to the optical center of the second camera are obtained, and according to the angles between the connection lines from the two edges of the second suspected touch object corresponding to two edges of the touch image block of the second suspected touch object respectively to the optical center of the second camera and the connection line from the optical center of the first camera to the optical center of the second camera, the second suspected direction information $\gamma_2$ is obtained. The second suspected direction information $\gamma_2$ is the angle between the connection line from the center of the second suspected touch object to the optical center of the second camera and the connection line from the optical center of the first camera to the optical center of the second camera. It can be seen from the previous text that the second suspected direction information $\gamma_2$ here is actually obtained also through the two angels. Finally, since the distance between the optical center of the first camera and the optical center of the second camera is known, the processing module may obtain location information of the first suspected touch object according to the first actual direction information $\beta$ and the first suspected direction information $\gamma_1$, and obtain location information of the second suspected touch object according to the first actual direction information $\beta$ and the second suspected direction information $\gamma_2$.

Figure 9:
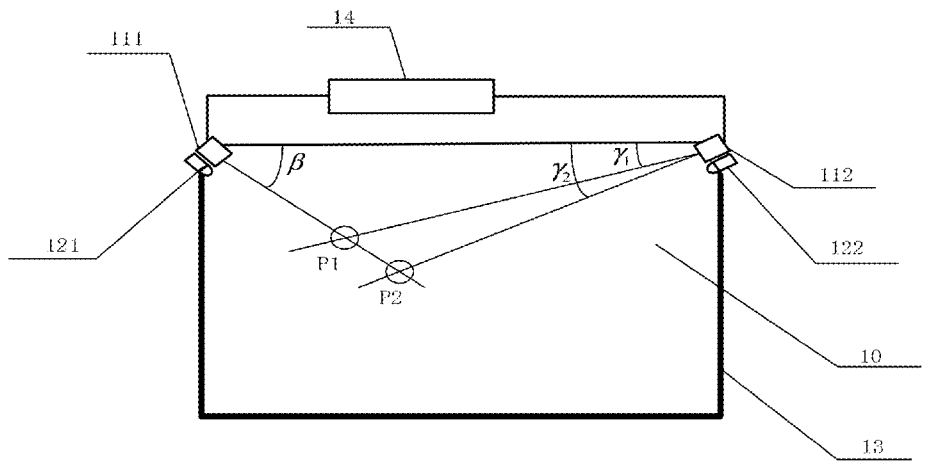
FIG. 9 is a schematic diagram showing the principle of a second solution of obtaining location information of two suspected touch objects in the second embodiment of the touch positioning method of the present invention.

FIG. 9 is a schematic diagram showing the principle of a second solution of obtaining location information of two suspected touch objects in the second embodiment of the touch positioning method of the present invention, with the difference from the principle schematic diagram as shown in FIG. 8 that the processing module directly obtains the first actual direction information $\beta$ according to the location information of the center of the tough image block in the first image data, and directly obtains the first suspected direction information $\gamma_1$ and the second suspected direction information $\gamma_2$ according to the location information of the center of the image block of the first suspected touch object and the location information of the center of the image block of the second suspected touch object in the third image data.

As to the above two solutions, the precision of the first solution is higher than that of the second solution.

At step 75, the processing module may also use two solutions to obtain location information of actual touch objects: the first solution is similar to the principle schematic diagram as shown in FIG. 8, wherein the processing module obtains, according to location information of two edges of the touch image block in the first image data, angles between the connection lines from the two edges of the actual touch object corresponding to two edges of the touch image block respectively to the optical center of the first camera and the connection line from the optical center of the first camera to the optical center of the second camera, and obtains, according to the angles between the connection lines from the two edges of the actual touch object corresponding to two edges of the touch image block respectively to the optical center of the first camera and the connection line from the optical center of the first camera to the optical center of the second camera, the first actual direction information, the first actual direction information being an angle between the connection line from the center of the actual touch object to the optical center of the first camera and the connection line from the optical center of the first camera to the optical center of the second camera; at the same time, the processing module obtains, according to location information of two edges of the image block of the actual tough object in the new third image data, angles between the connection lines from the two edges of the actual touch object corresponding to two edges of the image block of the actual touch object respectively to the optical center of the second camera and the connection line from the optical center of the first camera to the optical center of the second camera, and obtains, according to the angles between the connection lines from the two edges of the actual touch object corresponding to two edges of the image block of the actual touch object respectively to the optical center of the second camera and the connection line from the optical center of the first camera to the optical center of the second camera, the second actual direction information, the second actual direction information being an angle between the connection line from the center of the actual touch object to the optical center of the second camera and the connection line from the optical center of the first camera to the optical center of the second camera; finally, the processing module obtains location information of the actual touch object according to the first actual direction information and the second actual direction information.

The second solution is similar to the principle schematic diagram as shown in FIG. 9, wherein the processing module obtains, according to location information of the center of the touch image block in the first image data, the first actual direction information, the first actual direction information being an angle between the connection line from the center of the actual touch object to the optical center of the first camera and the connection line from the optical center of the first camera to the optical center of the second camera; at the same time, the processing module obtains, according to location information of the center of the image block of the actual tough object in the new third image data, the second actual direction information, the second actual direction information being an angle between the connection line from the center of the actual touch object to the optical center of the second camera and the connection line from the optical center of the first camera to the optical center of the second camera; finally, the processing module obtains location information of the actual touch object according to the first actual direction information and the second actual direction information.

In this embodiment, the processing module processes the image data collected by the first camera to obtain the first image data, and processes the image data collected by the second camera to obtain the second image data. When the second image data comprise at least three touch image blocks, the processing module merges the at least three touch image blocks into image blocks of two suspected touch objects so as to obtain the third image data; then it obtains location information of the two suspected touch objects according to the first image data and the third image data. When the two suspected touch objects are judges as located within the suspected area according to the location information of the two suspected touch objects, the distance between the two suspected touch objects is obtained according to the first image data and the third image data; when the distance between the two suspected touch objects is less than or equal to a preset threshold, the two suspected touch objects are considered as one actual touch object, image blocks of the two suspected touch objects in the third image data are merged into one image block of an actual touch object, and then location information of the actual touch object is obtained according to the first image data and the new third image data, thereby eliminating misjudgment caused by "crack dot".

Third Embodiment of Touch Positioning Method

Figure 10:
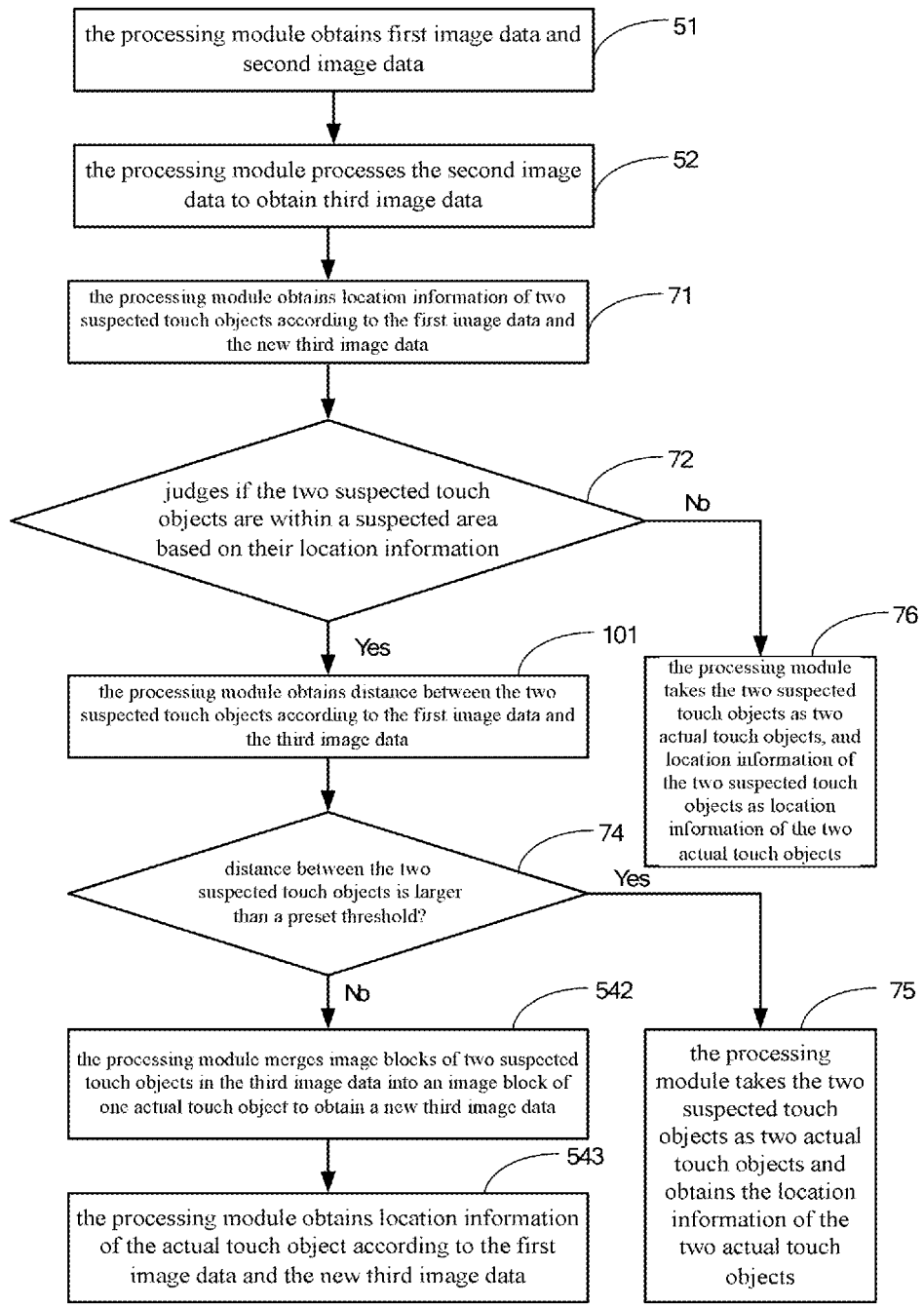
FIG. 10 is a schematic flowchart of a third embodiment of a touch positioning method of the present invention.

FIG. 10 is a schematic flowchart of the third embodiment of the touch positioning method of the present invention, with the difference from the schematic flowchart as shown in FIG. 7 being that step 73 may be the following step.

At step 101, if the two suspected touch objects are both located within the suspected area, the processing module obtains the distance between the two suspected touch objects according to the first image data and the third image data.

Figure 11:
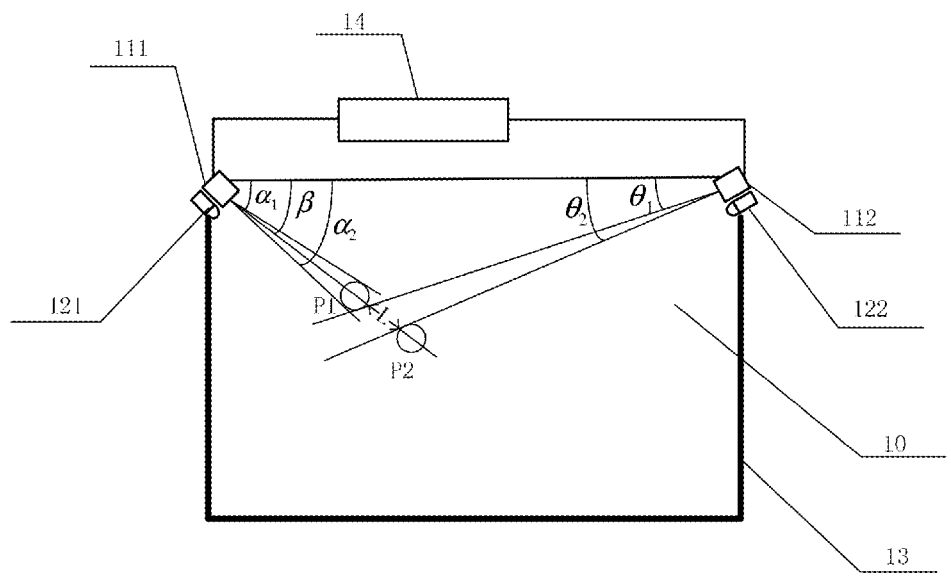
FIG. 11 is a schematic diagram showing the principle of obtaining the distance between two suspected touch objects in the third embodiment of the touch positioning method of the present invention.

Specifically, the two suspected touch objects comprise a first suspected touch object and a second suspected touch object. In the third image data, the first edge of the image block of the first suspected touch object is adjacent to the second edge of the image block of the second suspected touch object. The first edge of the image block of the first suspected touch object is an image of the first edge of the first suspected touch object, that is, the first edge of the image block of the first suspected touch object corresponds to the first edge of the first suspected touch object; the second edge of the image block of the second suspected touch object is an image of the second edge of the second suspected touch object, that is, the second edge of the image block of the second suspected touch object corresponds to the second edge of the second suspected touch object. How the processing module obtains the distance between the two suspected touch objects at step 101 is described below. FIG. 11 is a schematic diagram showing the principle of obtaining the distance between two suspected touch objects in the third embodiment of the touch positioning method of the present invention. The processing module obtains, according to location information of two edges of the touch image block in the first image data, angles $\alpha_1$ and $\alpha_2$ between the connection lines from the two edges of the first suspected touch object P1 corresponding to two edges of the touch image block respectively to the optical center of the first camera—i.e., camera 111—and the connection line from the optical center of the first camera to the optical center of the second camera, while the angles $\alpha_1$ and $\alpha_2$ are also angles between the connection lines from the two edges of the second suspected touch object P2 to the optical center of the first camera—i.e., camera 111—and the connection line from the optical center of the first camera to the optical center of the second camera; and then the processing module obtains the first actual direction information β according to the angles $\alpha_1$ and $\alpha_2$ between the connection lines from the two edges of the first suspected touch object corresponding to two edges of the touch image block respectively to the optical center of the first camera and the connection line from the optical center of the first camera to the optical center of the second camera, wherein the first actual direction information β is an angle between the connection line from the center of the first suspected touch object P1 to the optical center of the first camera and the connection line from the optical center of the first camera to the optical center of the second camera, and the first actual direction information β is also an angle between the connection line from the center of the second suspected touch object P2 to the optical center of the first camera and the connection line from the optical center of the first camera to the optical center of the second camera. This process is the same as the process of obtaining the first actual direction information in the principle schematic diagram shown in FIG. 8. Then, the processing module obtains, according to the location information of the first edge of the image block of the first suspected touch object in the third image data, the first edge direction information $\theta_1$, which is an angle between the connection line from the first edge of the first suspected touch object P1 to the optical center of the second camera (camera 112 herein) and the connection line from the optical center of the first camera to the optical center of the second camera, and obtains, according to the location information of the second edge of the image block of the second suspected touch object in the third image data, the second edge direction information $\theta_2$, which is an angle between the connection line from the second edge of the second suspected touch object P2 to the optical center of the second camera and the connection line from the optical center of the first camera to the optical center of the second camera. Then, the processing module obtains location information of the first edge of the first suspected touch object P1 according to the first actual direction information β and the first edge direction information $\theta_1$, and obtains location information of the second edge of the second suspected touch object P2 according to the first actual direction information β and the second edge direction information $\theta_2$; finally, the processing module obtains the distance L between location information of the first edge of the first suspected touch object and location information of the second edge of the second suspected touch object as the distance between the two suspected touch objects.

The precision of the distance between the two suspected touch objects obtained using the principle schematic diagram shown in FIG. 11 is higher than that of the distance between the two suspected touch objects obtained at step 73 in the previous embodiment.

In this embodiment, the processing module processes the image data collected by the first camera to obtain the first image data, and processes the image data collected by the second camera to obtain the second image data. When the second image data comprise at least three touch image blocks, the processing module merges the at least three touch image blocks into image blocks of two suspected touch objects so as to obtain the third image data; then it obtains location information of the two suspected touch objects according to the first image data and the third image data. When the two suspected touch objects are judges as both located within the suspected area according to the location information of the two suspected touch objects, the distance between the two suspected touch objects is obtained according to the first image data and the third image data; when the distance between the two suspected touch objects is less than or equal to a preset threshold, the two suspected touch objects are considered as one actual touch object, image blocks of the two suspected touch objects in the third image data are merged into one image block of an actual touch object, and then location information of the actual touch object is obtained according to the first image data and the new third image data, thereby eliminating misjudgment caused by "crack dot".

Fourth Embodiment of Touch Positioning Method

The schematic flowchart of this embodiment is the same as the schematic flowchart as shown in FIG. 5. On the basis of the schematic flowchart shown in FIG. 5, at step 53, the processing module may use two solutions to obtain the distance between two suspected touch objects.

The first solution is: the processing module first obtains location information of the two suspected touch objects according to the first image data and the third image data, and then obtains the distance between location information of the two suspected touch objects as the distance between the two suspected touch objects. Specifically, the processing module may further use two solutions to obtain location information of the two suspected touch objects, which two solutions specifically refer to the principle schematic diagrams shown in FIG. 8 and FIG. 9 and are no more described herein. At this time, at step 56, the processing module takes location information of the two suspected touch objects as location information of two actual touch objects.

The second solution is the same as the principle schematic diagram as shown in FIG. 11 and is no more described herein. At this time, at step 56, the two actual touch objects comprise a first actual touch object and a second actual touch object. The processing module may use two solutions to obtain location information of the two actual touch objects. The first solution is: the processing module obtains, according to location information of the center of the touch image block in the first image data, the first actual direction information, which is an angle between the connection line from the center of the first actual touch object to the optical center of the first camera and the connection line from the optical center of the first camera to the optical center of the second camera, and is also an angle between the connection line from the center of the second actual touch object to the optical center of the first camera and the connection line from the optical center of the first camera to the optical center of the second camera; obtains, according to location information of the center of the image block of the second actual tough object in the third image data, the second actual direction information, which is an angle between the connection line from the center of the first actual touch object to the optical center of the second camera and the connection line from the optical center of the first camera to the optical center of the second camera; obtains, according to location information of the center of the image block of the second actual tough object in the third image data, the third actual direction information, which is an angle between the connection line from the center of the second actual touch object to the optical center of the second camera and the connection line from the optical center of the first camera to the optical center of the second camera; obtains location information of the first actual touch object according to the first actual direction information and the second actual direction information, and obtains location information of the second actual touch object according to the first actual direction information and the third actual direction information. This solution is similar to the principle schematic diagram as shown in FIG. 9. The second solution is: the processing module obtains, according to location information of two edges of the touch image block in the first image data, angles between the connection lines from the two edges of the first actual touch object corresponding to two edges of the touch image block respectively to the optical center of the first camera and the connection line from the optical center of the first camera to the optical center of the second camera, such angles being also angles between the connection lines from the two edges of the second actual touch object respectively to the optical center of the first camera and the connection line from the optical center of the first camera to the optical center of the second camera, and obtains, according to the angles between the connection lines from the two edges of the first actual touch object corresponding to two edges of the touch image block respectively to the optical center of the first camera and the connection line from the optical center of the first camera to the optical center of the second camera, the first actual direction information, which is an angle between the connection line from the center of the first actual touch object to the optical center of the first camera and the connection line from the optical center of the first camera to the optical center of the second camera, and is also an angle between the connection line from the center of the second actual touch object to the optical center of the first camera and the connection line from the optical center of the first camera to the optical center of the second camera; the processing module further obtains, according to location information of two edges of the image block of the first actual tough object in the third image data, angles between the connection lines from the two edges of the first actual touch object respectively to the optical center of the second camera and the connection line from the optical center of the first camera to the optical center of the second camera, and obtains, according to the angles between the connection lines from the two edges of the first actual touch object respectively to the optical center of the second camera and the connection line from the optical center of the first camera to the optical center of the second camera, the second actual direction information, which is an angle between the connection line from the center of the first actual touch object to the optical center of the second camera and the connection line from the optical center of the first camera to the optical center of the second camera; the processing module further obtains, according to location information of two edges of the image block of the second actual tough object in the third image data, angles between the connection lines from the two edges of the second actual touch object respectively to the optical center of the second camera and the connection line from the optical center of the first camera to the optical center of the second camera, and obtains, according to the angles between the connection lines from the two edges of the second actual touch object respectively to the optical center of the second camera and the connection line from the optical center of the first camera to the optical center of the second camera, the third actual direction information, which is an angle between the connection line from the center of the second actual touch object to the optical center of the second camera and the connection line from the optical center of the first camera to the optical center of the second camera; the processing module then obtains location information of the first actual touch object according to the first actual direction information and the second actual direction information, and obtains location information of the second actual touch object according to the first actual direction information and the third actual direction information. This solution is similar to the principle schematic diagram as shown in FIG. 8.

In addition, at step 75, the processing module may use two solutions to obtain location information of the actual touch object, and the two solutions are the same as those used by the processing module in the second embodiment of the touch positioning method and are no more described herein.

In this embodiment, the processing module processes the image data collected by the first camera to obtain the first image data, and processes the image data collected by the second camera to obtain the second image data. When the second image data comprise at least three touch image blocks, the processing module merges the at least three touch image blocks into image blocks of two suspected touch objects so as to obtain the third image data; then it obtains the distance between the two suspected touch objects according to the first image data and the third image data; when the distance between the two suspected touch objects is less than or equal to a preset threshold, the two suspected touch objects are considered as one actual touch object, image blocks of the two suspected touch objects in the third image data are merged into one image block of an actual touch object, and then location information of the actual touch object is obtained according to the first image data and the new third image data, thereby eliminating misjudgment caused by "crack dot".

First Embodiment of Touch Screen

The structural schematic diagram of the embodiment is the same as the structural schematic diagram shown in FIG. 1, wherein the first camera specifically may be camera 111, and the second camera specifically may be camera 112. It should be noted that although only two cameras are shown as an example, the embodiment may further comprise more cameras.

Figure 12:
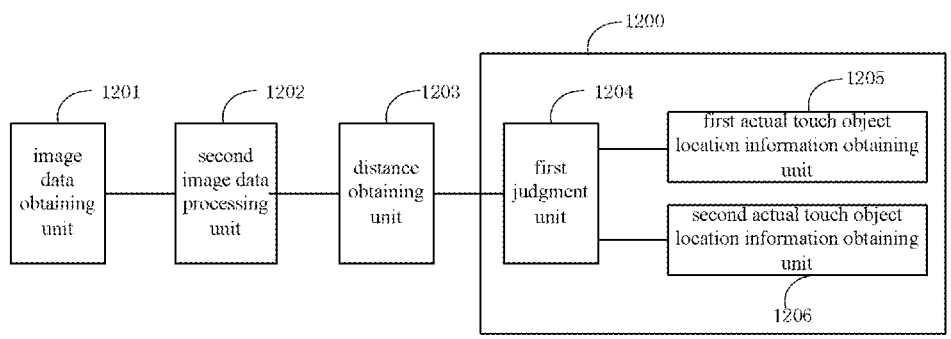
FIG. 12 is a structural schematic diagram of a processing module in the first embodiment of the touch screen of the present invention.

FIG. 12 is a structural schematic diagram of a processing module in the first embodiment of the touch screen of the present invention, which comprises an image data obtaining unit 1201, a second image data processing unit 1202, a distance obtaining unit 1203, and an actual touch object location information obtaining unit 1200.

The second image data processing unit 1202 is connected with the image data obtaining unit 1201, the distance obtaining unit 1203 is connected with the second image data processing unit 1202, and the actual touch object location information obtaining unit 1200 is connected with the distance obtaining unit 1203.

The image data obtaining unit 1201 is used to process images collected by the first camera to obtain the first image data, and to process images collected by the second camera to obtain the second image data, wherein the first image data comprises one touch image block therein and the second image data comprises at least two touch image blocks therein. Specifically, after the image data obtaining unit 1201 performs binarization with respect to images collected by the first camera and second camera, the first image data and second image data comprise two kinds of blocks, which are bright and dark image blocks, wherein the dark image block is a touch image block. The second image data processing unit 1202 is used to process the second image data to obtain third image data, the third image data comprising image blocks of two suspected touch objects. The distance obtaining unit 1203 is used to obtain the distance between the two suspected touch objects according to the first image data and the second image data. The actual touch object location information obtaining unit 1200 is used to obtain location information of the actual touch object according to the first image data, the third image data and the distance between the two suspected touch objects.

Further, the second image data processing unit 1202 may be used, when the second image data comprise two touch image blocks, to take the two touch image blocks as image blocks of two suspected touch objects; and when the second image data comprise at least three touch image blocks, to merge the at least three touch image blocks into image blocks of two suspected touch objects according to the distance between two adjacent edges of two adjacent touch image blocks. Specifically, when the second image data comprise at least three touch image blocks, the second image data processing unit 1202 orders the distance between two adjacent edges of two adjacent touch image blocks according to size, and then merges other touch image blocks than two adjacent touch image blocks with maximum distance in all the touch image blocks, so as to merge the at least three touch image blocks into image blocks of two suspected touch objects. The specific examples may refer to the schematic diagrams shown in FIG. 6A and FIG. 6B.

In this embodiment, the actual touch object location information obtaining unit 1200 may comprise a first judgment unit 1204, a first actual touch object location information obtaining unit 1205 and a second actual touch object location information obtaining unit 1206, wherein the first judgment unit 1204 is connected with the distance obtaining unit 1203, the first actual touch object location information obtaining unit 1205 is connected with the first judgment unit 1204, and the second actual touch object location information obtaining unit 1206 is connected with the first judgment unit 1204. The first judgment unit 1204 is used to judge whether the distance between the two suspected touch objects is larger than a preset threshold. The preset threshold may be determined according to the actual touch object commonly used, for example, when the touch object is a finger, the distance may be 12.7 mm. The first actual touch object location information obtaining unit 1205 is used, when the first judgment unit judges that the distance between the two suspected touch objects is less than or equal to the preset threshold, to merge image blocks of two suspected touch objects in the second image data into one image block of an actual touch object to obtain new second image data, or called a third image data, and obtain location information of the actual touch object according to the first image data and the third image data. The second actual touch object location information obtaining unit 1206 is used, when the first judgment unit judges that the distance between the two suspected touch objects is larger than the preset threshold, to take the two suspected touch objects as two actual touch objects and obtains location information of the two actual touch objects.

In this embodiment, the image data obtaining unit 1201 processes the image data collected by the first camera to obtain the first image data, and processes the image data collected by the second camera to obtain the second image data. When the second image data comprise at least three touch image blocks, the second image data processing unit 1202 merges the at least three touch image blocks into image blocks of two suspected touch objects to obtain the third image data. Then the distance obtaining unit 1203 obtains the distance between the two suspected touch objects according to the first image data and the third image data. The actual touch object location information obtaining unit 1200 obtains location information of the actual touch object according to the first image data, the third image data and the distance between the two suspected touch objects, thereby eliminating misjudgment caused by "crack dot".

Second Embodiment of Touch Screen

Figure 13:
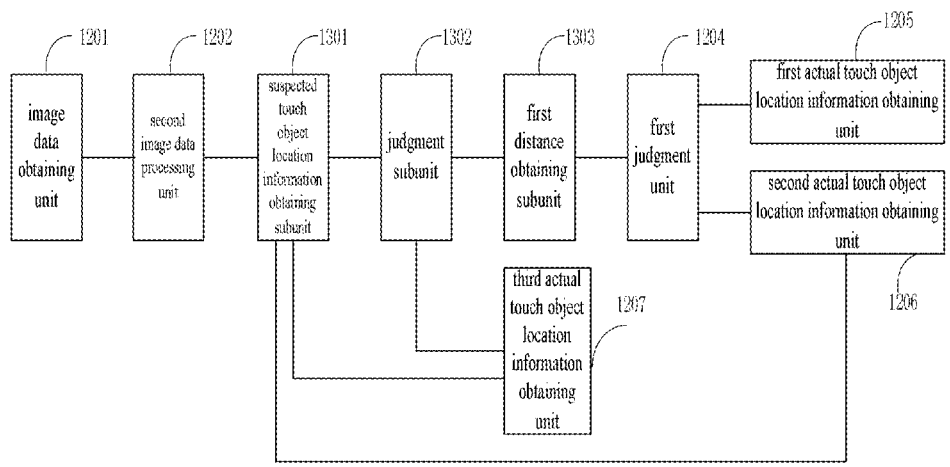
FIG. 13 is a structural schematic diagram of a processing module in the second embodiment of the touch screen of the present invention.

FIG. 13 is a structural schematic diagram of a processing module in the second embodiment of the touch screen of the present invention. On the basis of the structural schematic diagram as shown in FIG. 12, the distance obtaining unit 1203 may comprise a suspected touch object location information obtaining subunit 1301, a judgment subunit 1302 and a first distance obtaining subunit 1303, and the processing module may further comprise a third actual touch object location information obtaining unit 1207. The suspected touch object location information obtaining subunit 1301 is connected with the second image data processing unit 1202, the judgment subunit 1302 is connected with the suspected touch object location information obtaining subunit 1301, the first distance obtaining subunit 1303 is connected with the judgment subunit 1302, the third actual touch object location information obtaining unit 1207 is connected with the suspected touch object location information obtaining subunit 1301 and with the judgment subunit 1302. In addition, in this embodiment, the second actual touch object location information obtaining unit 1206 is also connected with the suspected touch object location information obtaining subunit 1301.

Further, in this embodiment, the two suspected touch objects comprise a first suspected touch object and a second suspected touch object; in the second image data, the first edge of the image block of the first suspected touch object is adjacent to the second edge of the image block of the second suspected touch object, the first edge of the image block of the first suspected touch object being an image of the first edge of the first suspected touch object, and the second edge of the image block of the second suspected touch object being an image of the second edge of the second suspected touch object.

The suspected touch object location information obtaining subunit 1301 is used to obtain location information of two suspected touch objects according to the first image data and the second image data. The judgment subunit 1302 is used to judge whether the two suspected touch objects are both located within a suspected area, which may be any closed area enclosing the second camera; preferably, the suspected area is a rectangle or a sector, the rectangle takes the optical center of the second camera as a vertex, and the sector takes the optical center of the second camera as circle center; optionally, the suspected area may further be the entire touch detection region or any other shape. The first distance obtaining subunit 1303 is used, when the judgment subunit 1302 judges that both the two suspected touch objects are located within the suspected area, to obtain the distance between location information of the two suspected touch objects as the distance between the two suspected touch objects. The third actual touch object location information obtaining unit 1207 is used, when the judgment subunit 1302 judges that not both the two suspected touch objects are located within the suspected area, to take the two suspected touch objects as two actual touch objects, and to take location information of the two suspected touch objects as location information of the two actual touch objects.

Further, in this embodiment, the suspected touch object location information obtaining subunit 1301 may use two solutions to obtain location information of the two suspected touch objects. The first solution is: the suspected touch object location information obtaining subunit 1301 obtains, according to location information of two edges of the touch image block in the first image data, angles between the connection lines from the two edges of the first suspected touch object corresponding to two edges of the touch image block respectively to the optical center of the first camera and the connection line from the optical center of the first camera to the optical center of the second camera, such angles being also angles between the connection lines from the two edges of the second suspected touch object respectively to the optical center of the first camera and the connection line from the optical center of the first camera to the optical center of the second camera, and obtains, according to the angles between the connection lines from the two edges of the first suspected touch object corresponding to two edges of the touch image block respectively to the optical center of the first camera and the connection line from the optical center of the first camera to the optical center of the second camera, the first actual direction information, which is an angle between the connection line from the center of the first suspected touch object to the optical center of the first camera and the connection line from the optical center of the first camera to the optical center of the second camera, and is also an angle between the connection line from the center of the second suspected touch object to the optical center of the first camera and the connection line from the optical center of the first camera to the optical center of the second camera; it further obtains, according to location information of two edges of the image block of the first suspected tough object in the second image data, angles between the connection lines from the two edges of the first suspected touch object corresponding to the two edges of the image block of the first suspected tough object respectively to the optical center of the second camera and the connection line from the optical center of the first camera to the optical center of the second camera, and obtains, according to the angles between the connection lines from the two edges of the first suspected touch object corresponding to the two edges of the image block of the first suspected tough object respectively to the optical center of the second camera and the connection line from the optical center of the first camera to the optical center of the second camera, the first suspected direction information, which is an angle between the connection line from the center of the first suspected touch object to the optical center of the second camera and the connection line from the optical center of the first camera to the optical center of the second camera; it further obtains, according to location information of two edges of the image block of the second suspected tough object in the second image data, angles between the connection lines from the two edges of the second suspected touch object respectively to the optical center of the second camera and the connection line from the optical center of the first camera to the optical center of the second camera, and obtains, according to the angles between the connection lines from the two edges of the second suspected touch object respectively to the optical center of the second camera and the connection line from the optical center of the first camera to the optical center of the second camera, the second suspected direction information, which is an angle between the connection line from the center of the second suspected touch object to the optical center of the second camera and the connection line from the optical center of the first camera to the optical center of the second camera; then it obtains location information of the first suspected touch object according to the first actual direction information and the first suspected direction information, and obtains location information of the second suspected touch object according to the first actual direction information and the second suspected direction information.

The specific process of the first solution may refer to the principle schematic diagram as shown in FIG. 8.

The second solution is: the suspected touch object location information obtaining subunit 1301 obtains, according to location information of the center of the touch image block in the first image data, the first actual direction information, which is an angle between the connection line from the center of the first suspected touch object to the optical center of the first camera and the connection line from the optical center of the first camera to the optical center of the second camera, and is also an angle between the connection line from the center of the second suspected touch object to the optical center of the first camera and the connection line from the optical center of the first camera to the optical center of the second camera; it further obtains, according to location information of the centers of the image blocks of the two suspected tough objects in the second image data, the first suspected direction information and the second suspected direction information, the first suspected direction information being an angle between the connection line from the center of the first suspected touch object to the optical center of the second camera and the connection line from the optical center of the first camera to the optical center of the second camera, the second suspected direction information being an angle between the connection line from the center of the second suspected touch object to the optical center of the second camera and the connection line from the optical center of the first camera to the optical center of the second camera; then it obtains location information of the first suspected touch object according to the first actual direction information and the first suspected direction information, and obtains location information of the second suspected touch object according to the first actual direction information and the second suspected direction information. The specific process of the first solution may refer to the principle schematic diagram as shown in FIG. 9.

As to the above two solutions, the precision of the first solution is higher than that of the second solution.

In addition, in this embodiment, the first actual touch object location information obtaining unit 1205 also may use two solutions to obtain location information of the actual touch object. The first solution is: the first actual touch object location information obtaining unit 1205 obtains, according to location information of the center of the touch image block in the first image data, the first actual direction information, which is an angle between the connection line from the center of the actual touch object to the optical center of the first camera and the connection line from the optical center of the first camera to the optical center of the second camera; obtains, according to location information of the center of the image block of the actual tough object in the new second image data, the second actual direction information, which is an angle between the connection line from the center of the actual touch object to the optical center of the second camera and the connection line from the optical center of the first camera to the optical center of the second camera; then it obtains location information of the actual touch object according to the first actual direction information and the second actual direction information. This solution is similar to the principle schematic diagram shown in FIG. 9.

The second solution is: the first actual touch object location information obtaining unit 1205 obtains, according to location information of two edges of the touch image block in the first image data, angles between the connection lines from the two edges of the actual touch object corresponding to two edges of the touch image block respectively to the optical center of the first camera and the connection line from the optical center of the first camera to the optical center of the second camera, and obtains, according to the angles between the connection lines from the two edges of the actual touch object corresponding to two edges of the touch image block respectively to the optical center of the first camera and the connection line from the optical center of the first camera to the optical center of the second camera, the first actual direction information, which is an angle between the connection line from the center of the actual touch object to the optical center of the first camera and the connection line from the optical center of the first camera to the optical center of the second camera; it further obtains, according to location information of two edges of the image block of the actual tough object in the new second image data, angles between the connection lines from the two edges of the actual touch object corresponding to two edges of the image block of the actual touch object respectively to the optical center of the second camera and the connection line from the optical center of the first camera to the optical center of the second camera, and obtains, according to the angles between the connection lines from the two edges of the actual touch object corresponding to two edges of the image block of the actual touch object respectively to the optical center of the second camera and the connection line from the optical center of the first camera to the optical center of the second camera, the second actual direction information, which is an angle between the connection line from the center of the actual touch object to the optical center of the second camera and the connection line from the optical center of the first camera to the optical center of the second camera; then it obtains location information of the actual touch object according to the first actual direction information and the second actual direction information. This solution is similar to the principle schematic diagram shown in FIG. 8.

In this embodiment, the second actual touch object location information obtaining unit 1206 is used, when the first judgment unit 1204 judges that the distance between the two suspected touch objects is larger than the preset threshold, to take the two suspected touch objects as two actual touch objects and take location information of the two suspected touch objects as location information of the two actual touch objects.

In this embodiment, the image data obtaining unit 1201 processes the image data collected by the first camera to obtain the first image data, and processes the image data collected by the second camera to obtain the second image data. When the second image data comprise at least three touch image blocks, the second image data processing unit 1202 merges the at least three touch image blocks into image blocks of two suspected touch objects, and then the suspected touch object location information obtaining subunit 1301 obtains location information of the two suspected touch objects. When the judgment subunit 1302 judges that location information of both the two suspected touch objects are located within the suspected area, the first distance obtaining subunit 1303 obtains the distance between location information of the two suspected touch objects as the distance between the two suspected touch objects. When the first judgment unit 1204 judges that the distance between the two suspected touch objects is less than or equal to the preset threshold, the first actual touch object location information obtaining unit 1205 considers the two suspected touch objects as one actual touch object, merges image blocks of two suspected touch objects in the second image data into an image block of one actual touch object, and then obtains location information of the actual touch object according to the first image data and the new second image data, thereby eliminating misjudgment caused by "crack dot".

Third Embodiment of Touch Screen

Figure 14:
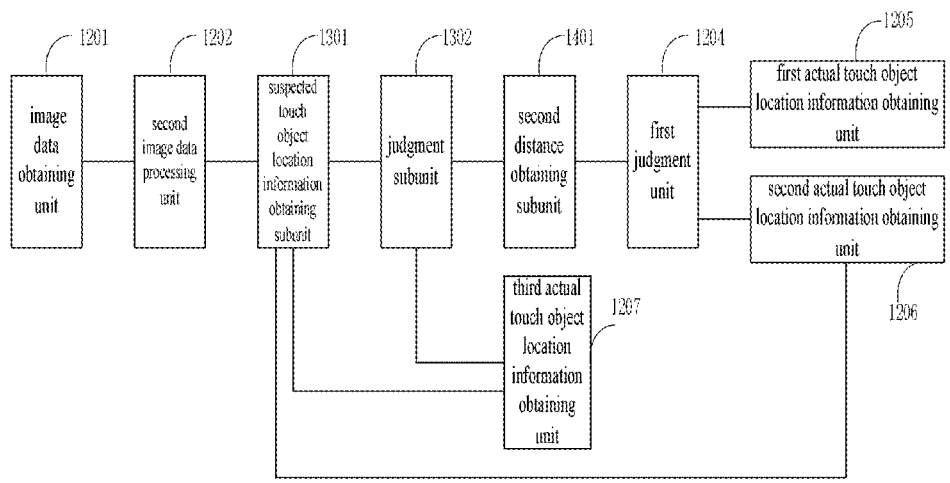
FIG. 14 is a structural schematic diagram of a processing module in the third embodiment of the touch screen of the present invention.

FIG. 14 is a structural schematic diagram of a processing module in the third embodiment of the touch screen of the present invention, with the difference from the schematic flowchart as shown in FIG. 13 that the first distance obtaining subunit 1303 may also be a second distance obtaining subunit 1401 for obtaining, when the judgment subunit 1302 judges that location information of both the two suspected touch objects are located within the suspected area, the distance between the two suspected touch objects according to the first image data and the second image data.

Further, in this embodiment, the two suspected touch objects comprise a first suspected touch object and a second suspected touch object; in the second image data, the first edge of the image block of the first suspected touch object is adjacent to the second edge of the image block of the second suspected touch object, the first edge of the image block of the first suspected touch object being an image of the first edge of the first suspected touch object, and the second edge of the image block of the second suspected touch object being an image of the second edge of the second suspected touch object.

Further, in this embodiment, the second distance obtaining subunit 1401 obtains, according to location information of two edges of the touch image block in the first image data, angles between the connection lines from the two edges of the first suspected touch object corresponding to two edges of the touch image block respectively to the optical center of the first camera and the connection line from the optical center of the first camera to the optical center of the second camera, such angles being also angles between the connection lines from the two edges of the second suspected touch object respectively to the optical center of the first camera and the connection line from the optical center of the first camera to the optical center of the second camera, and obtains, according to the angles between the connection lines from the two edges of the first suspected touch object corresponding to two edges of the touch image block respectively to the optical center of the first camera and the connection line from the optical center of the first camera to the optical center of the second camera, the first actual direction information, which is an angle between the connection line from the center of the first suspected touch object to the optical center of the first camera and the connection line from the optical center of the first camera to the optical center of the second camera, and is also an angle between the connection line from the center of the second suspected touch object to the optical center of the first camera and the connection line from the optical center of the first camera to the optical center of the second camera; it further obtains, according to location information of the first edge of the image block of the first suspected tough object in the second image data, the first edge direction information, which is an angle between the connection line from the first edge of the first suspected touch object to the optical center of the second camera and the connection line from the optical center of the first camera to the optical center of the second camera, and obtains, according to the location information of the second edge of the image block of the second suspected touch object in the second image data, the second edge direction information, which is an angle between the connection line from the second edge of the second suspected touch object to the optical center of the second camera and the connection line from the optical center of the first camera to the optical center of the second camera; then it obtains location information of the first edge of the first suspected touch object according to the first actual direction information and the first edge direction information, and obtains location information of the second edge of the second suspected touch object according to the first actual direction information and the second edge direction information; and then it obtains the distance between location information of the first edge of the first suspected touch object and location information of the second edge of the second suspected touch object as the distance between the two suspected touch objects. The specific process may refer to FIG. 11.

In this embodiment, the image data obtaining unit 1201 processes the image data collected by the first camera to obtain the first image data, and processes the image data collected by the second camera to obtain the second image data. When the second image data comprise at least three touch image blocks, the second image data processing unit 1202 merges the at least three touch image blocks into image blocks of two suspected touch objects, and then the suspected touch object location information obtaining subunit 1301 obtains location information of the two suspected touch objects. When the judgment subunit 1302 judges that location information of both the two suspected touch objects are located within the suspected area, the second distance obtaining subunit 1401 obtains the distance between the two suspected touch objects according to the first image data and the second image data. When the first judgment unit 1204 judges that the distance between the two suspected touch objects is less than or equal to the preset threshold, the first actual touch object location information obtaining unit 1205 considers the two suspected touch objects as one actual touch object, merges image blocks of two suspected touch objects in the second image data into an image block of one actual touch object, and then obtains location information of the actual touch object according to the first image data and the new second image data, thereby eliminating misjudgment caused by "crack dot".

Fourth Embodiment of Touch Screen

Based on the structural schematic diagram as shown in FIG. 12, the two suspected touch objects comprise a first suspected touch object and a second suspected touch object; in the second image data, the first edge of the image block of the first suspected touch object is adjacent to the second edge of the image block of the second suspected touch object, the first edge of the image block of the first suspected touch object being an image of the first edge of the first suspected touch object, and the second edge of the image block of the second suspected touch object being an image of the second edge of the second suspected touch object.

Further, in this embodiment, the distance obtaining unit 1203 obtains, according to location information of two edges of the touch image block in the first image data, angles between the connection lines from the two edges of the first suspected touch object corresponding to two edges of the touch image block respectively to the optical center of the first camera and the connection line from the optical center of the first camera to the optical center of the second camera, such angles being also angles between the connection lines from the two edges of the second suspected touch object respectively to the optical center of the first camera and the connection line from the optical center of the first camera to the optical center of the second camera, and obtains, according to the angles between the connection lines from the two edges of the first suspected touch object corresponding to two edges of the touch image block respectively to the optical center of the first camera and the connection line from the optical center of the first camera to the optical center of the second camera, the first actual direction information, which is the direction of the center of the first suspected touch object and of the optical center of the first camera, and is t also the direction of the center of the second suspected touch object and of the optical center of the first camera; it further obtains, according to location information of the first edge of the image block of the first suspected tough object in the second image data, the first edge direction information, which is an angle between the connection line from the first edge of the first suspected touch object to the optical center of the second camera and the connection line from the optical center of the first camera to the optical center of the second camera, and obtains, according to the location information of the second edge of the image block of the second suspected touch object in the second image data, the second edge direction information, which is an angle between the connection line from the second edge of the second suspected touch object to the optical center of the second camera and the connection line from the optical center of the first camera to the optical center of the second camera; then it obtains location information of the first edge of the first suspected touch object according to the first actual direction information and the first edge direction information, and obtains location information of the second edge of the second suspected touch object according to the first actual direction information and the second edge direction information; and it obtains the distance between location information of the first edge of the first suspected touch object and location information of the second edge of the second suspected touch object as the distance between the two suspected touch objects.

In addition, in this embodiment, the first actual touch object location information obtaining unit 1205 may use two solutions to obtain location information of the actual touch object, and these two solutions are the same as the two solutions used by the first actual touch object location information obtaining unit 1205 in the second embodiment of the touch screen and will not be described any more herein.

In addition, in this embodiment, the two actual touch objects comprise a first actual touch object and a second actual touch object. The second actual touch object location information obtaining unit 1206 also may use two solutions to obtain location information of the actual touch objects. The first solution is: the second actual touch object location information obtaining unit 1206 obtains, according to location information of the center of the touch image block in the first image data, the first actual direction information, which is an angle between the connection line from the center of the first actual touch object to the optical center of the first camera and the connection line from the optical center of the first camera to the optical center of the second camera, and is also an angle between the connection line from the center of the second actual touch object to the optical center of the first camera and the connection line from the optical center of the first camera to the optical center of the second camera, obtains, according to location information of the center of the image block of the first actual tough object in the second image data, the second actual direction information, which is an angle between the connection line from the center of the first actual touch object to the optical center of the second camera and the connection line from the optical center of the first camera to the optical center of the second camera, and obtains, according to location information of the center of the image block of the second actual tough object in the second image data, the third actual direction information, which is an angle between the connection line from the center of the second actual touch object to the optical center of the second camera and the connection line from the optical center of the first camera to the optical center of the second camera; then it obtains location information of the first actual touch object according to the first actual direction information and the second actual direction information, and obtains location information of the second actual touch object according to the first actual direction information and the third actual direction information. The second solution is: the second actual touch object location information obtaining unit 1206 obtains, according to location information of two edges of the touch image block in the first image data, angles between the connection lines from the two edges of the first actual touch object corresponding to two edges of the touch image block respectively to the optical center of the first camera and the connection line from the optical center of the first camera to the optical center of the second camera, such angles being also angles between the connection lines from the two edges of the second actual touch object respectively to the optical center of the first camera and the connection line from the optical center of the first camera to the optical center of the second camera, and obtains, according to the angles between the connection lines from the two edges of the first actual touch object corresponding to two edges of the touch image block respectively to the optical center of the first camera and the connection line from the optical center of the first camera to the optical center of the second camera, the first actual direction information, which is an angle between the connection line from the center of the first actual touch object to the optical center of the first camera and the connection line from the optical center of the first camera to the optical center of the second camera, and is also an angle between the connection line from the center of the second actual touch object to the optical center of the first camera and the connection line from the optical center of the first camera to the optical center of the second camera; it further obtains, according to location information of two edges of the image block of the first actual tough object in the second image data, angles between the connection lines from the two edges of the first actual touch object respectively to the optical center of the second camera and the connection line from the optical center of the first camera to the optical center of the second camera, and obtains, according to the angles between the connection lines from the two edges of the first actual touch object respectively to the optical center of the second camera and the connection line from the optical center of the first camera to the optical center of the second camera, the second actual direction information, which is an angle between the connection line from the center of the first actual touch object to the optical center of the second camera and the connection line from the optical center of the first camera to the optical center of the second camera; it also obtains, according to location information of two edges of the image block of the second actual tough object in the second image data, angles between the connection lines from the two edges of the second actual touch object respectively to the optical center of the second camera and the connection line from the optical center of the first camera to the optical center of the second camera, and obtains, according to the angles between the connection lines from the two edges of the second actual touch object respectively to the optical center of the second camera and the connection line from the optical center of the first camera to the optical center of the second camera, the third actual direction information, which is an angle between the connection line from the center of the second actual touch object to the optical center of the second camera and the connection line from the optical center of the first camera to the optical center of the second camera; then it obtains location information of the first actual touch object according to the first actual direction information and the second actual direction information, and obtains location information of the second actual touch object according to the first actual direction information and the third actual direction information.

In this embodiment, the image data obtaining unit 1201 processes the image data collected by the first camera to obtain the first image data, and processes the image data collected by the second camera to obtain the second image data. When the second image data comprise at least three touch image blocks, the second image data processing unit 1202 merges the at least three touch image blocks into image blocks of two suspected touch objects, and then the distance obtaining unit 1203 obtains the distance between the two suspected touch objects according to the first image data and the second image data. When the first judgment unit 1204 judges that the distance between the two suspected touch objects is less than or equal to the preset threshold, the first actual touch object location information obtaining unit 1205 considers the two suspected touch objects as one actual touch object, merges image blocks of two suspected touch objects in the second image data into an image block of one actual touch object, and then obtains location information of the actual touch object according to the first image data and the new second image data, thereby eliminating misjudgment caused by "crack dot".

Fifth Embodiment of Touch Screen

Figure 15:
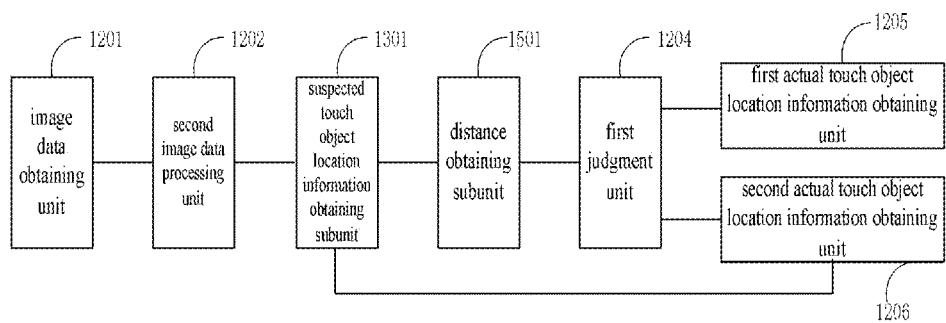
FIG. 15 is a structural schematic diagram of a touch module in a fifth embodiment of the touch screen of the present invention.

FIG. 15 is a structural schematic diagram of a processing module in a fifth embodiment of the touch screen of the present invention. On the basis of the structural schematic diagram as shown in FIG. 12, the distance obtaining unit 1203 may comprise a suspected touch object location information obtaining subunit 1301 and a distance obtaining subunit 1501. The suspected touch object location information obtaining subunit 1301 is connected with the second image data processing unit 1202, the distance obtaining subunit 1501 is connected with the suspected touch object location information obtaining subunit 1301, and the first judgment unit 1204 is connected with the distance obtaining subunit 1501. In this embodiment, the second actual touch object location information obtaining unit 1206 is also connected with the suspected touch object location information obtaining subunit 1301.

The suspected touch object location information obtaining subunit 1301 is used to obtain location information of the two suspected touch objects according to the first image data and the second image data. The distance obtaining subunit 1501 is used to obtain the distance between location information of the two suspected touch objects as the distance between the two suspected touch objects.

In this embodiment, the suspected touch object location information obtaining subunit 1301 may use two solutions to obtain location information of the two suspected touch objects, and the two solutions may refer to the second embodiment of the touch screen and will not be described any more herein.

In addition, in this embodiment, the second actual touch object location information obtaining unit 1206 is used, when the first judgment unit 1204 judges that the distance between the two suspected touch objects is larger than the preset threshold, to take two suspected touch objects as two actual touch objects and take location information of the two suspected touch objects as location information of the two actual touch objects.

In addition, in this embodiment, the first actual touch object location information obtaining unit 1205 may use two solutions to obtain location information of the actual touch object, and these two solutions are the same as the two solutions used by the first actual touch object location information obtaining unit 1205 in the second embodiment of the touch screen and will not be described any more herein.

In this embodiment, the image data obtaining unit 1201 processes the image data collected by the first camera to obtain the first image data, and processes the image data collected by the second camera to obtain the second image data. When the second image data comprise at least three touch image blocks, the second image data processing unit 1202 merges the at least three touch image blocks into image blocks of two suspected touch objects, then the suspected touch object location information obtaining subunit 1301 obtains location information of the two suspected touch objects according to the first image data and the second image data, and the distance obtaining subunit 1501 obtains the distance between the two suspected touch objects. When the first judgment unit 1204 judges that the distance between the two suspected touch objects is less than or equal to the preset threshold, the first actual touch object location information obtaining unit 1205 considers the two suspected touch objects as one actual touch object, merges image blocks of two suspected touch objects in the second image data into an image block of one actual touch object, and then obtains location information of the actual touch object according to the first image data and the new second image data, thereby eliminating misjudgment caused by "crack dot".

Embodiment of Touch System

This embodiment may comprise any module and unit in all the embodiments of the touch screen described previously, and will not be described any more herein.

Embodiment of Display

Figure 16:
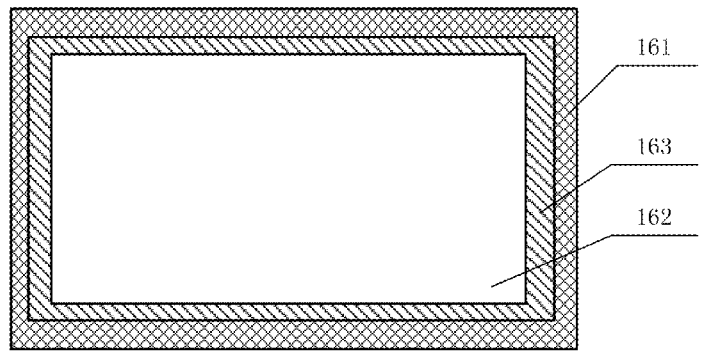
FIG. 16 is a structural schematic diagram of an embodiment of a display of the present invention.

FIG. 16 is a structural schematic diagram of an embodiment of a display of the present invention, comprising a display unit and a touch screen 163. The display unit comprises a display screen 161 and a display frame 162. The touch screen 163 is mounted in front of the display screen 161, close to the user side, and is located in the display frame 162.

In addition, the touch screen 163 may further be mounted outside the display frame 162, and the touch screen 163 may further be integrated with the display frame 162.

The touch screen 163 may comprise any module and unit in all the embodiments of the touch screen described previously, and will not be described any more herein.

The technical solution of the present invention is not limited to the embodiments described in Detailed Description of the Preferred Embodiments. Other means according to the technical solution of the present invention derived by those skilled in the art likewise belong to the extent of renovation of techniques of the present invention.

The invention claimed is:

1. A touch positioning method, characterized in that the method is applied to a camera based touch screen comprising at least two cameras and a regression reflection bar, the at least two cameras comprising a first camera and a second camera, the method comprising:

processing image collected by the first camera to obtain first image data, and processing image collected by the second camera to obtain second image data, wherein the first image data comprise one touch image block, and the second image data comprise at least two touch image blocks;

processing the second image data to obtain a third image data, the third image data comprising image blocks of two suspected touch objects;

obtaining a distance between the two suspected touch objects according to the first image data and the third image data;

in response to the distance between the two suspected touch objects being less than or equal to a preset threshold, merging image blocks of two suspected touch objects in the third image data into an image block of one actual touch object to obtain new third image data, and obtaining location information of the actual touch object according to the first image data and the new third image data; and in response to the distance between the two suspected touch objects being larger than the preset threshold, taking the two suspected touch objects as two actual touch objects and obtaining location information of the two actual touch objects.

2. The method according to claim 1, characterized in that said processing the second image data to obtain third image data comprises:

when the second image data comprise two touch image blocks, taking the two touch image blocks as image blocks of two suspected touch objects and the second image data as the third image data;

when the second image data comprise at least three touch image blocks, merging, the at least three touch image blocks into image blocks of two suspected touch objects according to distances between two adjacent edges of two adjacent touch image blocks, and taking the merged second image data as the third image data.

3. The method according to claim 1, characterized in that said obtaining the distance between the two suspected touch objects according to the first image data and the third image data comprises:

obtaining location information of the two suspected touch objects according to the first image data and the third image data and taking the distance between location information of the two suspected touch objects as the distance between the two suspected touch objects;

wherein, in response to the distance between the two suspected touch objects being larger than a preset threshold, the two suspected touch objects are taken as two actual touch objects and the location information of the two suspected touch objects is taken as location information of the two actual touch objects.

4. The method according to claim 1, characterized in that said obtaining the distance between the two suspected touch objects according to the first image data and the third image data comprises:

obtaining location information of the two suspected touch objects according to the first image data and the third image data, and if location information of both the two suspected touch objects are located within a suspected area, obtaining the distance between location information of the two suspected touch objects as the distance between the two suspected touch objects, wherein the suspected area is an area near the second camera;

the method further comprising: if not location information of both the two suspected touch objects are located within the suspected area, taking the two suspected touch objects as two actual touch objects, and taking location information of the two suspected touch objects as location information of the two actual touch objects;

wherein, in response to the distance between the two suspected touch objects being larger than a preset threshold, the two suspected touch objects are taken as two actual touch objects and the location information of the two suspected touch objects is taken as location information of the two actual touch objects.

5. The method according to claim 1, characterized by further comprising, before said obtaining the distance between the two suspected touch objects according to the first image data and the third image data, obtaining location information of the two suspected touch objects according to the first image data and the third image data;

said obtaining the distance between the two suspected touch objects according to the first image data and the third image data specifically being: if location information of both the two suspected touch objects are located within a suspected area, obtaining the distance between the two suspected touch objects according to the first image data and the third image data, wherein the suspected area is an area near the second camera;

the method further comprising: if not location information of both the two suspected touch objects are located within the suspected area, taking the two suspected touch objects as two actual touch objects, and taking location information of the two suspected touch objects as location information of the two actual touch objects;

wherein, in response to the distance between the two suspected touch objects being larger than a preset threshold, the two suspected touch objects are taken as two actual touch objects and the location information of the two suspected touch objects is taken as location information of the two actual touch objects.

6. The method according to claim 4 or 5, characterized in that the suspected area is any closed area enclosing the second camera.

7. The method according to any one of claims 3 to 5, characterized in that the two suspected touch objects comprise a first suspected touch object and a second suspected touch object, and said obtaining location information of the two suspected touch objects according to the first image data and the third image data comprises:

obtaining, according to location information of a center of the touch image block in the first image data, first actual direction information, the first actual direction information being an angle between a connection line from the center of the first suspected touch object to an optical center of the first camera and the connection line from the optical center of the first camera to the optical center of the second camera;

obtaining, according to location information of centers of the image blocks of the two suspected touch objects in the third image data, first suspected direction information and second suspected direction information, the first suspected direction information being an angle between the connection line from the center of the first suspected touch object to the optical center of the second camera and the connection line from the optical center of the first camera to the optical center of the second camera, the second suspected direction information being an angle between the connection line from the center of the second suspected touch object to the optical center of the second camera and the connection line from the optical center of the first camera to the optical center of the second camera;

obtaining location information of the first suspected touch object according to the first actual direction information and the first suspected direction information, and obtaining location information of the second suspected touch object according to the first actual direction information and the second suspected direction information.

8. The method according to any one of claims 3 to 5, characterized in that the two suspected touch objects comprise a first suspected touch object and a second suspected touch object, and said obtaining location information of the two suspected touch objects according to the first image data and the third image data comprises:
 obtaining, according to location information of two edges of the touch image block in the first image data, angles between the connection lines from the two edges of the first suspected touch object corresponding to the two edges of the touch image block respectively to an optical center of the first camera and the connection line from the optical center of the first camera to an optical center of the second camera, and obtaining, according to the angles between the connection lines from the two edges of the first suspected touch object corresponding to the two edges of the touch image block respectively to the optical center of the first camera and the connection line from the optical center of the first camera to the optical center of the second camera, first actual direction information, the first actual direction information being an angle between the connection line from the center of the first suspected touch object to the optical center of the first camera and the connection line from the optical center of the first camera to the optical center of the second camera;
 obtaining, according to location information of two edges of the image block of the first suspected touch object in the third image data, angles between the connection lines from the two edges of the first suspected touch object corresponding to the two edges of the image block of the first suspected touch object respectively to the optical center of the second camera and the connection line from the optical center of the first camera to the optical center of the second camera, and obtaining, according to the angles between the connection lines from the two edges of the first suspected touch object corresponding to the two edges of the image block of the first suspected touch object respectively to the optical center of the second camera and the connection line from the optical center of the first camera to the optical center of the second camera, first suspected direction information, the first suspected direction information being an angle between the connection line from the center of the first suspected touch object to the optical center of the second camera and the connection line from the optical center of the first camera to the optical center of the second camera;
 obtaining, according to location information of two edges of the image block of the second suspected touch object in the third image data, angles between the connection lines from the two edges of the second suspected touch object respectively to the optical center of the second camera and the connection line from the optical center of the first camera to the optical center of the second camera, and obtaining, according to the angles between the connection lines from the two edges of the second suspected touch object respectively to the optical center of the second camera and the connection line from the optical center of the first camera to the optical center of the second camera, second suspected direction information, the second suspected direction information being an angle between the connection line from the center of the second suspected touch object to the optical center of the second camera and the connection line from the optical center of the first camera to the optical center of the second camera;
 obtaining location information of the first suspected touch object according to the first actual direction information and the first suspected direction information, and obtaining location information of the second suspected touch object according to the first actual direction information and the second suspected direction information.

9. The method according to claim 1, characterized in that the two suspected touch objects comprise a first suspected touch object and a second suspected touch object, and in the third image data, a first edge of the image block of the first suspected touch object is adjacent to a second edge of the image block of the second suspected touch object, the first edge of the image block of the first suspected touch object is an image of a first edge of the first suspected touch object, and the second edge of the image block of the second suspected touch object is an image of a second edge of the second suspected touch object;
 said obtaining the distance between the two suspected touch objects according to the first image data and the third image data comprises:
 obtaining, according to location information of two edges of the touch image block in the first image data, angles between the connection lines from the two edges of the first suspected touch object corresponding to the two edges of the touch image block respectively to an optical center of the first camera and the connection line from the optical center of the first camera to an optical center of the second camera, and obtaining, according to the angles between the connection lines from the two edges of the first suspected touch object corresponding to the two edges of the touch image block respectively to the optical center of the first camera and the connection line from the optical center of the first camera to the optical center of the second camera, first actual direction information, the first actual direction information being an angle between the connection line from the center of the first suspected touch object to the optical center of the first camera and the connection line from the optical center of the first camera to the optical center of the second camera;
 obtaining, according to the location information of the first edge of the image block of the first suspected touch object in the third image data, first edge direction information, the first edge direction information being an angle between the connection line from the first edge of the first suspected touch object to the optical center of the second camera and the connection line from the optical center of the first camera to the optical center of the second camera;
 obtaining, according to the location information of the second edge of the image block of the second suspected touch object in the third image data, second edge direction information, the second edge direction information being an angle between the connection line from the second edge of the second suspected touch object to the optical center of the second camera and the connection line from the optical center of the first camera to the optical center of the second camera;

obtaining location information of the first edge of the first suspected touch object according to the first actual direction information and the first edge direction information, and obtaining location information of the second edge of the second suspected touch object according to the first actual direction information and the second edge direction information; and obtaining the distance between the location information of the first edge of the first suspected touch object and the location information of the second edge of the second suspected touch object as the distance between the two suspected touch objects.

10. The method according to claim 1, characterized in that the two actual touch objects comprise a first actual touch object and a second actual touch object, and said obtaining location information of the two actual touch objects comprises:

obtaining, according to location information of the center of the touch image block in the first image data, first actual direction information, the first actual direction information being an angle between the connection line from the center of the first actual touch object to an optical center of the first camera and the connection line from the optical center of the first camera to an optical center of the second camera;

obtaining, according to location information of the center of the image block of the first actual touch object in the third image data, second actual direction information, the second actual direction information being an angle between the connection line from the center of the first actual touch object to the optical center of the second camera and the connection line from the optical center of the first camera to the optical center of the second camera;

obtaining, according to location information of the center of the image block of the second actual touch object in the third image data, third actual direction information, the third actual direction information being an angle between the connection line from the center of the second actual touch object to the optical center of the second camera and the connection line from the optical center of the first camera to the optical center of the second camera;

obtaining location information of the first actual touch object according to the first actual direction information and the second actual direction information, and obtaining location information of the second actual touch object according to the first actual direction information and the third actual direction information.

11. The method according to claim 1, characterized in that the two actual touch objects comprise a first actual touch object and a second actual touch object, and said obtaining location information of the two actual touch objects comprises:

obtaining, according to location information of two edges of the touch image block in the first image data, angles between the connection lines from the two edges of the first actual touch object corresponding to the two edges of the touch image block respectively to an optical center of the first camera and the connection line from the optical center of the first camera to an optical center of the second camera, and obtaining, according to the angles between the connection lines from the two edges of the first actual touch object corresponding to two edges of the touch image block respectively to the optical center of the first camera and the connection line from the optical center of the first camera to the optical center of the second camera, first actual direction information, the first actual direction information being an angle between the connection line from the center of the first actual touch object to the optical center of the first camera and the connection line from the optical center of the first camera to the optical center of the second camera;

obtaining, according to location information of two edges of the image block of the first actual touch object in the third image data, angles between the connection lines from the two edges of the first actual touch object respectively to the optical center of the second camera and the connection line from the optical center of the first camera to the optical center of the second camera, and obtaining, according to the angles between the connection lines from the two edges of the first actual touch object respectively to the optical center of the second camera and the connection line from the optical center of the first camera to the optical center of the second camera, second actual direction information, the second actual direction information being an angle between the connection line from the center of the first actual touch object to the optical center of the second camera and the connection line from the optical center of the first camera to the optical center of the second camera;

obtaining, according to location information of two edges of the image block of the second actual touch object in the third image data, angles between the connection lines from the two edges of the second actual touch object respectively to the optical center of the second camera and the connection line from the optical center of the first camera to the optical center of the second camera, and obtaining, according to the angles between the connection lines from the two edges of the second actual touch object respectively to the optical center of the second camera and the connection line from the optical center of the first camera to the optical center of the second camera, third actual direction information, the third actual direction information being an angle between the connection line from the center of the second actual touch object to the optical center of the second camera and the connection line from the optical center of the first camera to the optical center of the second camera;

obtaining location information of the first actual touch object according to the first actual direction information and the second actual direction information, and obtaining location information of the second actual touch object according to the first actual direction information and the third actual direction information.

12. The method according to claim 1, characterized in that said obtaining location information of the actual touch object according to the first image data and the new third image data comprises:

obtaining, according to location information of the center of the touch image block in the first image data, first actual direction information, the first actual direction information being an angle between the connection line from the center of the actual touch object to an optical center of the first camera and the connection line from the optical center of the first camera to an optical center of the second camera;

obtaining, according to location information of the center of the image block of the actual touch object in the new third image data, second actual direction information, the second actual direction information being an angle between the connection line from the center of the actual touch object to the optical center of the second camera and the connection line from the optical center of the first camera to the optical center of the second camera;

obtaining location information of the actual touch object according to the first actual direction information and the second actual direction information.

13. The method according to claim 1, characterized in that said obtaining location information of the actual touch object according to the first image data and the new third image data comprises:

obtaining, according to location information of two edges of the touch image block in the first image data, angles between the connection lines from the two edges of the actual touch object corresponding to the two edges of the touch image block respectively to an optical center of the first camera and the connection line from the optical center of the first camera to an optical center of the second camera, and obtaining, according to the angles between the connection lines from the two edges of the actual touch object corresponding to the two edges of the touch image block respectively to the optical center of the first camera and the connection line from the optical center of the first camera to the optical center of the second camera, first actual direction information, the first actual direction information being an angle between the connection line from the center of the actual touch object to the optical center of the first camera and the connection line from the optical center of the first camera to the optical center of the second camera;

obtaining, according to location information of two edges of the image block of the actual touch object in the new third image data, angles between the connection lines from the two edges of the actual touch object corresponding to the two edges of the image blocks of the actual touch object respectively to the optical center of the second camera and the connection line from the optical center of the first camera to the optical center of the second camera, and obtaining, according to the angles between the connection lines from the two edges of the actual touch object corresponding to the two edges of the image blocks of the actual touch object respectively to the optical center of the second camera and the connection line from the optical center of the first camera to the optical center of the second camera, second actual direction information, the second actual direction information being an angle between the connection line from the center of the actual touch object to the optical center of the second camera and the connection line from the optical center of the first camera to the optical center of the second camera;

obtaining location information of the actual touch object according to the first actual direction information and the second actual direction information.

14. A touch screen, comprising at least two cameras, at least two light sources, a regression reflection bar and a processing module, the at least two cameras comprising a first camera and a second camera, characterized in that the processing module comprises:

an image data obtaining unit for processing image collected by the first camera to obtain first image data, and processing image collected by the second camera to obtain second image data, wherein the first image data comprise one touch image block, and the second image data comprise at least two touch image blocks;

a second image data processing unit for processing the second image data to obtain third image data, the third image data comprising image blocks of two suspected touch objects;

a distance obtaining unit for obtaining a distance between the two suspected touch objects according to the first image data and the third image data;

an actual touch object location information obtaining unit, which comprises a first judgment unit for judging whether the distance between the two suspected touch objects is larger than a preset threshold, a first actual touch object location information obtaining unit for merging, when the first judgment unit judges that the distance between the two suspected touch objects is less than or equal to the preset threshold, image blocks of two suspected touch objects in the third image data into an image block of one actual touch object to obtain new third image data, and obtaining location information of the actual touch object according to the first image data and the third new image data, and a second actual touch object location information obtaining unit for taking, when the first judgment unit judges that the distance between the two suspected touch objects is larger than the preset threshold, the two suspected touch objects as two actual touch objects and obtaining location information of the two actual touch objects.

15. The touch screen according to claim 14, characterized in that the second image data processing unit is used to: when the second image data comprise two touch image blocks, take the two touch image blocks as image blocks of two suspected touch objects and the second image data as the third image data; when the second image data comprise at least three touch image blocks, merge the at least three touch image blocks into image blocks of two suspected touch objects according to distances between two adjacent edges of two adjacent touch image blocks, and take the merged second image data as the third image data.

16. The touch screen according to claim 14, characterized in that the distance obtaining unit comprises:

a suspected touch object location information obtaining subunit for obtaining location information of the two suspected touch objects according to the first image data and the third image data;

a distance obtaining subunit for obtaining the distance between location information of the two suspected touch objects as the distance between the two suspected touch objects, said second actual touch object location information obtaining unit being used for taking the location information of the two suspected touch objects as location information of the two actual touch objects.

17. The touch screen according to claim 14, characterized in that the distance obtaining unit comprises:

a suspected touch object location information obtaining subunit for obtaining location information of the two suspected touch objects according to the first image data and the third image data, a judgment subunit for judging whether location information of both the two suspected touch objects are located within a suspected area, wherein the suspected area is an area near the second camera;

a first distance obtaining subunit for obtaining, when the judgment subunit judges that location information of both the two suspected touch objects are located within the suspected area, the distance between location information of the two suspected touch objects as the distance between the two suspected touch objects, the processing module further comprising:
a third actual touch object location information obtaining unit for taking, when the judgment subunit judges that not location information of both the two suspected touch objects are located within the suspected area, the two suspected touch objects as two actual touch objects and location information of the two suspected touch objects as location information of the two actual touch objects.

18. The touch screen according to claim 14, characterized in that the distance obtaining unit comprises:
a suspected touch object location information obtaining subunit for obtaining location information of the two suspected touch objects according to the first image data and the third image data,
a judgment subunit for judging whether location information of both the two suspected touch objects are located within a suspected area;
a second distance obtaining subunit for obtaining, when the judgment subunit judges that location information of both the two suspected touch objects are located within the suspected area, the distance between the two suspected touch objects according to the first image data and the third image data;
the processing module further comprising:
a third actual touch object location information obtaining unit for taking, when the judgment subunit judges that not location information of both the two suspected touch objects are located within the suspected area, the two suspected touch objects as two actual touch objects and location information of the two suspected touch objects as location information of the two actual touch objects.

19. The touch screen according to any one of claims 16 to 18, characterized in that the suspected touch object location information obtaining subunit is used for obtaining, according to location information of the center of the touch image block in the first image data, first actual direction information, the first actual direction information being an angle between the connection line from the center of a first suspected touch object to an optical center of the first camera and the connection line from the optical center of the first camera to an optical center of the second camera; obtaining, according to location information of the centers of the image blocks of the two suspected touch objects in the third image data, first suspected direction information and second suspected direction information, the first suspected direction information being an angle between the connection line from the center of the first suspected touch object to the optical center of the second camera and the connection line from the optical center of the first camera to the optical center of the second camera, the second suspected direction information being an angle between the connection line from the center of a second suspected touch object to the optical center of the second camera and the connection line from the optical center of the first camera to the optical center of the second camera; obtaining location information of the first suspected touch object according to the first actual direction information and the first suspected direction information, and obtaining location information of the second suspected touch object according to the first actual direction information and the second suspected direction information.

20. The touch screen according to any one of claims 16 to 18, characterized in that the suspected touch object location information obtaining subunit is used for:
obtaining, according to location information of two edges of the touch image block in the first image data, angles between the connection lines from the two edges of a first suspected touch object corresponding to the two edges of the touch image block respectively to an optical center of the first camera and the connection line from the optical center of the first camera to an optical center of the second camera, and obtaining, according to the angles between the connection lines from the two edges of the first suspected touch object corresponding to the two edges of the touch image block respectively to the optical center of the first camera and the connection line from the optical center of the first camera to the optical center of the second camera, first actual direction information, the first actual direction information being an angle between the connection line from the center of the first suspected touch object to the optical center of the first camera and the connection line from the optical center of the first camera to the optical center of the second camera;
obtaining, according to location information of two edges of the image block of the first suspected touch object in the third image data, angles between the connection lines from the two edges of the first suspected touch object corresponding to the two edges of the image block of the first suspected touch object respectively to the optical center of the second camera and the connection line from the optical center of the first camera to the optical center of the second camera, and obtaining, according to the angles between the connection lines from the two edges of the first suspected touch object corresponding to the two edges of the image block of the first suspected touch object respectively to the optical center of the second camera and the connection line from the optical center of the first camera to the optical center of the second camera, first suspected direction information, the first suspected direction information being an angle between the connection line from the center of the first suspected touch object to the optical center of the second camera and the connection line from the optical center of the first camera to the optical center of the second camera;
obtaining, according to location information of two edges of the image block of a second suspected touch object in the third image data, angles between the connection lines from the two edges of the second suspected touch object respectively to the optical center of the second camera and the connection line from the optical center of the first camera to the optical center of the second camera, and obtaining, according to the angles between the connection lines from the two edges of the second suspected touch object respectively to the optical center of the second camera and the connection line from the optical center of the first camera to the optical center of the second camera, second suspected direction information, the second suspected direction information being an angle between the connection line from the center of the second suspected touch object to the optical center of the second camera and the connection line from the optical center of the first camera to the optical center of the second camera;
obtaining location information of the first suspected touch object according to the first actual direction information and the first suspected direction information, and obtaining location information of the second suspected touch object according to the first actual direction information and the second suspected direction information.

21. The touch screen according to claim 14, characterized in that the two suspected touch objects comprise a first suspected touch object and a second suspected touch object, and in the third image data, a first edge of the image block of the first suspected touch object is adjacent to a second edge of the image block of the second suspected touch object, the first edge of the image block of the first suspected touch object is an image of a first edge of the first suspected touch object, and the second edge of the image block of the second suspected touch object is an image of a second edge of the second suspected touch object;

the distance obtaining unit being used for:

obtaining, according to location information of two edges of the touch image block in the first image data, angles between the connection lines from the two edges of the first suspected touch object corresponding to the two edges of the touch image block respectively to an optical center of the first camera and the connection line from the optical center of the first camera to an optical center of the second camera, and obtaining, according to the angles between the connection lines from the two edges of the first suspected touch object corresponding to the two edges of the touch image block respectively to the optical center of the first camera and the connection line from the optical center of the first camera to the optical center of the second camera, first actual direction information, the first actual direction information being an angle between the connection line from the center of the first suspected touch object to the optical center of the first camera and the connection line from the optical center of the first camera to the optical center of the second camera;

obtaining, according to the location information of the first edge of the image block of the first suspected touch object in the third image data, first edge direction information, the first edge direction information being an angle between the connection line from the first edge of the first suspected touch object to the optical center of the second camera and the connection line from the optical center of the first camera to the optical center of the second camera;

obtaining, according to the location information of the second edge of the image block of the second suspected touch object in the third image data, second edge direction information, the second edge direction information being an angle between the connection line from the second edge of the second suspected touch object to the optical center of the second camera and the connection line from the optical center of the first camera to the optical center of the second camera;

obtaining location information of the first edge of the first suspected touch object according to the first actual direction information and the first edge direction information, and obtaining location information of the second edge of the second suspected touch object according to the first actual direction information and the second edge direction information; and obtaining a distance between the location information of the first edge of the first suspected touch object and the location information of the second edge of the second suspected touch object as the distance between the two suspected touch objects.

22. The touch screen according to claim 14, characterized in that the second actual touch object location information obtaining unit is used for obtaining, according to location information of the center of the touch image block in the first image data, first actual direction information, the first actual direction information being an angle between the connection line from the center of a first actual touch object to an optical center of the first camera and the connection line from the optical center of the first camera to an optical center of the second camera; obtaining, according to location information of the center of the image block of the first actual touch object in the third image data, second actual direction information, the second actual direction information being an angle between the connection line from the center of the first actual touch object to the optical center of the second camera and the connection line from the optical center of the first camera to the optical center of the second camera; obtaining, according to location information of the center of the image block of a second actual touch object in the third image data, third actual direction information, the third actual direction information being an angle between the connection line from the center of the second actual touch object to the optical center of the second camera and the connection line from the optical center of the first camera to the optical center of the second camera; obtaining location information of the first actual touch object according to the first actual direction information and the second actual direction information, and obtaining location information of the second actual touch object according to the first actual direction information and the third actual direction information.

23. The touch screen according to claim 14, characterized in that the second actual touch object location information obtaining unit is used for:

obtaining, according to location information of two edges of the touch image block in the first image data, angles between the connection lines from the two edges of a first actual touch object corresponding to the two edges of the touch image block respectively to an optical center of the first camera and the connection line from the optical center of the first camera to an optical center of the second camera, and obtaining, according to the angles between the connection lines from the two edges of the first actual touch object corresponding to two edges of the touch image block respectively to the optical center of the first camera and the connection line from the optical center of the first camera to the optical center of the second camera, first actual direction information, the first actual direction information being an angle between the connection line from the center of the first actual touch object to the optical center of the first camera and the connection line from the optical center of the first camera to the optical center of the second camera;

obtaining, according to location information of two edges of the image block of the first actual touch object in the third image data, angles between the connection lines from the two edges of the first actual touch object respectively to the optical center of the second camera and the connection line from the optical center of the first camera to the optical center of the second camera, and obtaining, according to the angles between the connection lines from the two edges of the first actual touch object respectively to the optical center of the second camera and the connection line from the optical center of the first camera to the optical center of the second camera, second actual direction information, the second actual direction information being an angle between the connection line from the center of the first actual touch object to the optical center of the second camera and the connection line from the optical center of the first camera to the optical center of the second camera;

obtaining, according to location information of two edges of the image block of the second actual touch object in the third image data, angles between the connection lines from the two edges of a second actual touch object respectively to the optical center of the second camera and the connection line from the optical center of the first camera to the optical center of the second camera, and obtaining, according to the angles between the connection lines from the two edges of the second actual touch object respectively to the optical center of the second camera and the connection line from the optical center of the first camera to the optical center of the second camera, third actual direction information, the third actual direction information being an angle between the connection line from the center of the second actual touch object to the optical center of the second camera and the connection line from the optical center of the first camera to the optical center of the second camera;

obtaining location information of the first actual touch object according to the first actual direction information and the second actual direction information, and obtaining location information of the second actual touch object according to the first actual direction information and the third actual direction information.

24. The touch screen according to claim 14, characterized in that the first actual touch object location information obtaining unit is used for obtaining, according to location information of the center of the touch image block in the first image data, first actual direction information, the first actual direction information being an angle between the connection line from the center of the actual touch object to an optical center of the first camera and the connection line from the optical center of the first camera to an optical center of the second camera; obtaining, according to location information of the center of the image block of the actual touch object in the new third image data, second actual direction information, the second actual direction information being an angle between the connection line from the center of the actual touch object to the optical center of the second camera and the connection line from the optical center of the first camera to the optical center of the second camera; and obtaining location information of the actual touch object according to the first actual direction information and the second actual direction information.

25. The touch screen according to claim 14, characterized in that the first actual touch object location information obtaining unit is used for:

obtaining, according to location information of two edges of the touch image block in the first image data, angles between the connection lines from the two edges of the actual touch object corresponding to the two edges of the touch image block respectively to an optical center of the first camera and the connection line from the optical center of the first camera to an optical center of the second camera, and obtaining, according to the angles between the connection lines from the two edges of the actual touch object corresponding to the two edges of the touch image block respectively to the optical center of the first camera and the connection line from the optical center of the first camera to the optical center of the second camera, first actual direction information, the first actual direction information being an angle between the connection line from the center of the actual touch object to the optical center of the first camera and the connection line from the optical center of the first camera to the optical center of the second camera;

obtaining, according to location information of two edges of the image block of the actual touch object in the new third image data, angles between the connection lines from the two edges of the actual touch object corresponding to the two edges of the image block of the actual touch object respectively to the optical center of the second camera and the connection line from the optical center of the first camera to the optical center of the second camera, and obtaining, according to the angles between the connection lines from the two edges of the actual touch object corresponding to the two edges of the image block of the actual touch object respectively to the optical center of the second camera and the connection line from the optical center of the first camera to the optical center of the second camera, second actual direction information, the second actual direction information being an angle between the connection line from the center of the actual touch object to the optical center of the second camera and the connection line from the optical center of the first camera to the optical center of the second camera; and obtaining location information of the actual touch object according to the first actual direction information and the second actual direction information.

* * * * *